(12) United States Patent
Khoreva et al.

(10) Patent No.: US 12,430,550 B2
(45) Date of Patent: Sep. 30, 2025

(54) TRAINING METHOD FOR A GENERATOR NEURAL NETWORK IMPOSING DATA EQUIVARIANCES

(71) Applicant: Robert Bosch GmbH, Stuttgart (DE)

(72) Inventors: Anna Khoreva, Stuttgart (DE); Dan Zhang, Leonberg (DE); Edgar Schoenfeld, Amsterdam (NL)

(73) Assignee: ROBERT BOSCH GMBH, Stuttgart (DE)

( * ) Notice: Subject to any disclaimer, the term of this patent is extended or adjusted under 35 U.S.C. 154(b) by 1268 days.

(21) Appl. No.: 17/149,430

(22) Filed: Jan. 14, 2021

(65) Prior Publication Data

US 2021/0241102 A1 Aug. 5, 2021

(30) Foreign Application Priority Data

Feb. 3, 2020 (EP) .................................... 20155187

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC .................................. G06N 3/08; G06N 3/045
See application file for complete search history.

(56) References Cited

U.S. PATENT DOCUMENTS

| | | | |
|---|---|---|---|
| 10,430,946 B1* | 10/2019 | Zhou | A61B 5/02007 |
| 10,783,394 B2* | 9/2020 | Molchanov | G06N 3/088 |
| 2019/0066493 A1* | 2/2019 | Sohn | G06N 3/08 |
| 2019/0130220 A1* | 5/2019 | Zou | G06N 3/08 |
| 2019/0220977 A1* | 7/2019 | Zhou | G06N 3/084 |
| 2020/0090357 A1* | 3/2020 | Pagé-Caccia | G06T 7/50 |
| 2020/0175329 A1* | 6/2020 | Malaya | G06V 10/774 |
| 2021/0241102 A1* | 8/2021 | Khoreva | G06V 10/82 |

OTHER PUBLICATIONS

Kurach et al. (A Large-Scale Study on Regularization and Normalization in GANs, May 2019, pp. 1-18) (Year: 2019).*
Norgaard et al. (Synthetic Sensor Data Generation for Health Applications: A Supervised Deep Learning Approach, Jul. 2018, pp. 1164-1167) (Year: 2018).*
Alharbi et al. (Synthetic Sensor Data for Human Activity Recognition, Jul. 2020, pp. 1-9) (Year: 2020).*
Schlegl, et al.: "Unsupervised Anomaly Detection with Generative Adversarial Networks to Guide Marker Discovery", arxiv.org, Cornell University Library, (2017) IPMI 2017, XP080757690, pp. 1-12.

(Continued)

*Primary Examiner* — George Giroux
(74) *Attorney, Agent, or Firm* — NORTON ROSE FULBRIGHT US LLP

(57) ABSTRACT

A training method for training a generator neural network configured to generate synthesized sensor data. A fidelity destroying transformation is defined configured to transform a measured sensor data to obtain a fidelity-destroyed transformed measured sensor data. A fidelity preserving transformation is defined configured to transform a measured sensor data to obtain a fidelity-preserved transformed measured sensor data.

14 Claims, 9 Drawing Sheets

(56) References Cited

OTHER PUBLICATIONS

Nidhi, Kalra, et al., "How Many Miles of Driving Would it Take to Demonstrate Autonomous Vehicle Reliability?," Rand Corporation, 2016, pp. 1-15. https://www.rand.org/content/dam/rand/pubs/research_reports/RR1400/RR1478/RAND_RR1478.pdf.
Goodfellow, Ian J., et al., "Generative Adversarial Nets," NIPS'14: Proceedings of the 27th International Conference on Neural Information Processing Systems, vol. 2, 2014, pp. 1-9. https://proceedings.neurips.cc/paper/2014/file/5ca3e9b122f61f8f06494c97b1afccf3-Paper.pdf.
Brock, Andrew, et al., "Large Scale Gan Training for High Fidelity Natural Image Synthesis," International Conference on Learning Representations (ICLR), Cornell University, 2019, pp. 1-35. https://arxiv.org/pdf/1809.11096.pdf.
Park, Taesung, et al., "Semantic Image Synthesis With Spatially-Adaptive Normalization," Cornell University, 2019, pp. 1-19. https://arxiv.org/pdf/1903.07291.pdf.
Zhu et al., "Unpaired Image-to-Image Translation Using Cycle-Consistent Adversarial Networks," Cornell University, 2018, pp. 1-18. https://arxiv.org/pdf/1703.10593.pdf.
Mattyus and Urtasun: "Matching Adversarial Networks", 2018 IEEE/CVF Conference on Computer Vision and Pattern Recognition, IEEE Computer Society, pp. 8024-8032, XP033473724.
Mikolajczyk and Grochowski: "Data augmentation for improving deep learning in image classification problem", 2018 International Interdisciplinary PhD Workshop (IIPHDW), IEEE, pp. 117-122, XP033360783.
Yang, et al.: "Real-to-Virtual Domain Unification for End-to-End Autonomous Driving", 15th European Conference (ECCV 2018), Munich, Germany, Sep. 8-14, 2018, Proceedings, Part IV, Springer Berlin Heidelberg, Berlin Germany, pp. 1-16, XP055704028.

\* cited by examiner

TRAINING METHOD FOR A GENERATOR NEURAL NETWORK IMPOSING DATA EQUIVARIANCES

CROSS REFERENCE

The present application claims the benefit under 35 U.S.C. § 119 of European Patent Application No. EP 20155187.6 filed on Feb. 3, 2020, which is expressly incorporated herein by reference in its entirety.

FIELD

The presently invention relates to a training method for training a generator neural network, a method to generate further training data for a machine learnable model, a method to train a machine learnable model, a training system for training a generator neural network, a generator system for a generator neural network, and an autonomous apparatus and a computer readable medium.

BACKGROUND INFORMATION

Machine learnable models find a wide application in many fields of technology. For example, in parts production a machine learnable model may classify a produced part as fault from a sensor reading of the part, e.g., an image taken with an image sensor. Automated quality control has the potential to greatly reduce the percentage of faulty parts produced, e.g., components and the like. An image sensor coupled to a machine learnable model can eliminate almost all parts with visible defects.

For example, in autonomous driving a machine learnable model may classify an object in the environment of the autonomous vehicle as another car, cyclist, pedestrian and so on, e.g., from a sensor reading of the environment. The sensor reading may be obtained with sensors such as an image sensor, LIDAR and so on. A controller of the vehicle will use the classification in making driving decisions. For example, the car may need to reduce speed if a pedestrian appears to be about to cross the road, while there is no need to adjust the driving for a sign waiting at the side of the road-unless the sign is classified as a traffic sign, in which case such a need may arise, and so on.

To train or test a machine learnable model, e.g., comprising a neural network, training data is needed. Such training data may be obtained by taking sensor measurement in an environment that is similar to the one expected to be encountered in practice. However, obtaining the right kind or the right amount of training data is sometimes hard. For example, there may be too little training data for the complexity of a particular machine learnable model, while obtaining additional training data is costly or even impossible. Another problem is that getting enough training data of the right kind is difficult. For example, in the case of an autonomous vehicle, such as a car, if it is currently summer, then obtaining additional training data in a winter landscape will not be possible until it is winter. Another problem is that dangerous situations, e.g., crashes and near crashes, occur only seldom and hard to enact artificially. Between 2009 and 2015, a fleet of autonomous cars traveled 1.3 million miles and was involved in 11 crashes. (see the article "How Many Miles of Driving Would It Take to Demonstrate Autonomous Vehicle Reliability?", by Nidhi Kalra, and Susan M. Paddock, included herein by reference). Although any crash is one too many, for testing and training purposes, the sensor data of 11 crashes is not much.

Additional training data may be generated using a generated neural network. In particular, generative adversarial networks (GANs) are a powerful tool for data synthesis, e.g., for generating natural looking images, as well as for learning feature representations. A generator neural network may be configured to generate synthesized sensor data, that looks like measured sensor data. For example, a generator neural network may be configured to generate synthesized sensor data from scratch, e.g., taking a noise vector as input and producing the synthesized sensor data as output. For example, a generator neural network may be configured transform existing measured sensor data from one domain to another, e.g., from summer to winter, or from LIDA sensor data to image sensor data, etc. A generator neural network may be configured to take an additional input, e.g., a class label, indicating to the generator neural network the type of synthesized measured, e.g., the time of year, the type of car in the synthesized sensor data, and so on. Another application is to transfer measured sensor data from one modality to another, e.g., from radar to image data or vice versa. This may make complementary data from different origins interchangeable for the use of the system.

A preferred way to train a generator neural network is together with a discriminator neural network, e.g., in a so-called generative adversarial network (GAN). A GAN comprises at least two neural networks: a generator, and a discriminator. The two networks are trained jointly through adversarial training, e.g., the two networks compete in a game, where the discriminator is optimized to distinguish original images from the training set from images generated by the generator network. Conversely, the generator is trained to make its generated images less and less distinguishable from those contained in the training dataset. In their standard form, GANs generate independent samples from their model of the training data distribution and need no label information for training or generation. For example, see the article "Generative Adversarial Nets" by Ian J. Goodfellow, et al., included herein by reference.

An important subclass of GANs are conditional GANs (cGANs), which receive one or more additional inputs to both generator and discriminator networks, and can thus generate new data conditioned on user-specified information. The basic use case is to provide a class label, and then generate images of only that particular class. Recently cGANs have been successfully used to generate photo-realistic synthetic images of different classes; see, e.g., the article 'Large scale GAN training for high fidelity natural image synthesis', by Andrew Brock, et al., included herein by reference. cGANs have been also successfully employed for image-to-image and label-to-image translation tasks, aiming to generate realistic looking images while conditioning on dense information such as images or label maps and making use of some prior information about the scene; see, e.g., the article "Semantic Image Synthesis with Spatially-Adaptive Normalization", by Taesung Park, et al., included herein by reference

SUMMARY

First approaches are aimed to learn a direct mapping from source images to target images given paired input-output image pairs as training data. Given two domains X and Y, for each image $x \in X$ there is a corresponding $y \in Y$, and the goal is to find a translator $G: X \rightarrow Y$ such that $G(x) \approx y$. Because this group of methods employs paired data for training they can be considered as supervised learning.

Other methods also tackle the unpaired setting of image-to-image translation, where the goal is to relate two independent sets of images from two different domains and there exist no paired examples showing how an image could be translated to a corresponding image in another domain. This problem is inherently ill-posed and requires additional constraints. A popular approach is CycleGAN, which assumes cycle-consistency and the existence of an inverse mapping F that translates from Y to X, e.g., F:Y→X such that F(y)≈x. It trains two generators which are bijections and inverse to each other (G and F) and uses two discriminators (DX and DY) to ensure the translated image appears to be drawn from the target domain as well as the cycle-consistency constraint to ensure the translated image can be mapped back to the original image using the inverse mapping, e.g., F(G(x))≈x and G(F(y))≈y. See, for example the article "Unpaired image-to-image translation using cycle-consistent adversarial networks" by Jun-Yan Zhu, et al., included herein by reference.

A problem with learning image mappings such as domain transfers, but also with pure image generation is that there is no guarantee that the system will learn to generate images that make sense. As a result, some generated data may correspond to a situation that is not physically possible. This is a problem, especially if the generated images are used to train or test a further system. For example, when a generated image is used to test the safety of a further device, then the test will be meaningless if the generated image does not correspond to a situation which the device can encounter in normal use.

State of the art neural networks are often over-parameterized and require vast amounts of data to train. One solution to this is to incorporate prior knowledge about the data distribution into the model, making the training procedure easier and the model more robust. One form of such prior knowledge relies on the concept of symmetry properties of the data, e.g., invariance/equivariance, e.g., the known transformations of the input which leave the desired output (class label, label map, image, etc.) unchanged or change the output in a specific and predictable way with respect to the input transformation.

Current approaches to exploiting data symmetries use an explicit analytic representation of the desired transformations formulated as a mathematical group and apply this to convolutional neural network filter weights. An example of such a transformation group could be the set of rotations by 90 degrees. These transformations would then need to be represented analytically as a parametrized set of functions which are used to generate additional transformed versions of learned convolutional filters. In this way, the network has a multiplicative increase in the number of filters used for producing output representations while keeping the number of trainable weights constant. Additionally, by capturing all transformations of the features learned by the filters, the network is now equivariant with respect to that transformation group. The analytic method is both cumbersome, as well as impractical. As soon as the type of equivariance is less well defined, or more complicated, this approach becomes infeasible. Moreover, the resulting configuration is inflexible; since the equivariance is hard-coded in the network architecture it is complicated to change it.

It would be advantageous to have an improved training method for training a generator neural network configured to generate synthesized sensor data, and such methods are provided in accordance with example embodiments of the present invention.

For example, in accordance with an example embodiment of the present invention, the method may comprise training the generator neural network together with a discriminator neural network. The training may comprise generating synthesized sensor data using the generator neural network. For example, the discriminator network may be optimized to distinguish between measured sensor data and the synthesized sensor data, while the generator network may be optimized to generate synthesized sensor data which is indistinguishable from measured sensor data by the discriminator network.

Interestingly, transformations can be defined that transform measured sensor data. The transforms can be used within training to increase control of the kind of images that the discriminator will accept. This will improve the training signal of discriminator which in turn improves the generator.

For example, a fidelity destroying transformation may be defined, which is configured to transform a measured sensor data to obtain a fidelity-destroyed transformed measured sensor data. The training may comprise optimizing the discriminator network to distinguish between measured sensor data and fidelity-destroyed transformed measured sensor data.

For example, a fidelity preserving transformation is defined configured to transform a measured sensor data to obtain a fidelity-preserved transformed measured sensor data. The training may comprise optimizing the discriminator network not to distinguish between measured sensor data or fidelity-preserving transformed measured sensor data.

A fidelity preserving transformation preserves the properties that the generator aims to learn. For example, in an embodiment the measured sensor data in the training data may be a collection of street-images obtained through an image sensor, and applying the fidelity preserving transformation produces images that could have been drawn from the same distribution. In other words, applying a fidelity preserving transformation to a measured sensor data should give an image that would be regarded as success if that image were generated by a trained generator neural network. Hence, for example, in an embodiment a fidelity preserving transformation may mean that it is preserving a distribution of the samples, or images.

On the other hand, a fidelity destroying transformation degrades the properties that the generator aims to learn. For example, in an embodiment the measured sensor data in the training data may be a collection of street-images obtained through an image sensor, and applying the fidelity destroying transformation produces images that could not have been drawn from the same distribution. In other words, applying a fidelity destroying transformation to a measured sensor data should give an image that would be regarded as a failure if that image were generated by a trained generator neural network.

Interestingly, in an embodiment of the present invention, the optimization is over the difference between the discriminator output, e.g., a distinguishing data, a discriminator value, etc. for example, if the transformation is fidelity preserving, said difference should be small, whereas if the transformation is fidelity destroying the difference should be large, e.g., in absolute value or in magnitude. In an embodiment, these two differences are combined in single loss term, e.g., by taking their ratio. An advantage of optimizing a difference instead of the desired discriminator output directly, is that even when the quality of the discriminator is not yet very good, the discriminator will already be trained on having equivariant properties.

Through the transformations, e.g., the fidelity preserving transformation or the fidelity destroying transformation, additional prior knowledge can be integrated in the trained model. For example, prior knowledge regarding data symmetry, e.g., invariance and equivariance, properties of the data can be incorporated into training of the (c)GAN models with little effort. No changing of the generator or discriminator network is needed. This leads to an improved and more robust performance of the generator. Using transformations as in an embodiment also allows a straightforward correction of problems in the model; for example, suppose after training of an image-translation network, an input is found which after rotation over a small amount, say 1-degree causes a breakdown of the network, e.g., a clearly wrong translation. In that case, 1-degree transformation may be added as fidelity-preserving transformations In an embodiment of the present invention, one or both transformations are applied in one or more new losses for the discriminator and/or generator training. The losses force the generator to become equivariant under the transformation that preserves the conditional information, e.g., identity of object class, while the decision of the discriminator about the sample coming from a real or fake class should be invariant to those transformations. This prior knowledge may be provided as additional supervision for training the discriminator and generator. Thus, given a fidelity preserving transformation, a generator neural network may be obtained that is equivariant for that transformation, without having to change the architecture of the generator neural network. Thus, given a fidelity destroying transformation, a discriminator can be obtained that is forced to learn that particular types of sensor data are not acceptable, which in turn leads to a better training signal for the generator.

The measured sensor data may be obtained from one or more sensors, some of which may be spatial sensors, e.g., image sensors LIDAR and so. For example, the measured sensor data may comprise a measured image obtained from an image sensor; and the synthesized sensor data may comprise a synthesized image. Typically, the synthesized sensor data and the measured sensor data have the same resolution. For example, the sensor data may include sensor signals from one or more sensors such as, e.g., video, radar, LiDAR, ultrasonic, motion, imaging camera, and so on. A sensor data may comprise sensor signals from multiple sensor modalities, e.g., image and radar sensor signals. The measured sensor data may comprise audio data. The measured and synthesized sensor data may comprise a plurality of values indicating a plurality of sensor values. For example, pixels in image like data, or samples, in audio like data, and so on.

Training the discriminator and/or generator network may use otherwise conventional training techniques such a backpropagation, e.g., using techniques used in GAN training, e.g., using a system such as ADAM. The GAN may be a CycleGAN, but this is not necessary.

Examples of fidelity-destroying transformations include: a blurring operating, perturbation of pixels, a horizontal mirror operation, a spline operation, a color-change, a partial overwriting, a rotation over a threshold, etc.

For example, a horizontal mirror operation when executed in a street-scene image removes the image from the domain of images that could have been obtained from the image sensor. In other words, a generator neural network that produces an up-side-down street scene is a failure. The same holds for large rotations, e.g., rotations over a threshold, e.g., rotations between 30 and 150 degrees. Consider a rotation of 90 degrees of a street scene. In such a case, the sky would be located on the side, and cars would drive in a physically impossible direction. Yet on a small local scale, the image might look perfectly realistic. Thus, the fidelity destroying operation encourages the discriminator to take global aspects of the image into account.

A further example of fidelity-destroying operations is CutMix operations, in which a composed sensor data is created from two other sensor data, e.g., measured or synthesized sensor data. For example, a street scene of two different streets combined into a single image is not globally realistic even if locally it looks valid.

Examples of fidelity-preserving transformations include one or more of: an affine transformation, a rotation, a translation, a vertical mirror operation. For example, a street scene that is mirror over a vertical axis remains a valid street scene; a generator neural network that produces a synthesized sensor data which is identical to a real measured sensor data except for this operation would perform well. For example, a small rotation, or a small affine transformation, e.g., below a threshold. For example, a rotation of less than 5 degrees may be considered fidelity-preserving. The effect of introducing this would cause the discriminator to allow such small rotations, and as a consequence this will be reflected in the training signal to the generator.

The discriminator may be configured to generate a discriminator value indicating at least if a discriminator input is a synthesized sensor data or a measured sensor data. In an embodiment, the discriminator values obtained for one or more transformation is included in one or more additional loss terms.

For example, the discriminator network may be applied to a measured sensor data, e.g., a real image. The fidelity-destroying transformation may be applied to the measured sensor data, and the discriminator network may be applied to the result. If the discriminator network is well-trained the first ought to give an indication of a real image, say, a 1 value, while the latter ought to give an indication of a fake image, say, a 0 value. Thus, by maximizing this difference the discriminator network is made aware of this class of non-real images. This in turn will impact the generator network due to a better training signal. The maximizing may be for the magnitude, e.g., the absolute value.

The fidelity-preserving transformation may be applied to the measured sensor data, and the discriminator network may be applied to the result. In this case, the real and transformed image should give the same discriminator output, e.g., that both are real images. Thus, the difference between discriminator values may be minimized.

Good results have been obtained by combining both types of optimizing in a single loss term. For example, one could use as an additional loss-term the following: $(\alpha \|D(T(x))-D(x)\|+1)/(\beta\|D(F(x))-D(x)\|+\varepsilon)$, wherein α, β and ε represent parameters, D represents the discriminator network T represents the fidelity-destroying transformation, F represents the fidelity-preserving transformation, and x represents a measured sensor data.

The parameters α, β and ε may be, e.g., 1. Note that this single term causes $(\alpha\|D(T(x))-D(x)\|+1)$ to be maximized and $(\beta\|D(F(x))-D(x)\|+\varepsilon)$ to be minimized. However, in this way the forces caused by the fidelity-destroying transformation versus the fidelity-preserving transformation can be balanced against each other.

For example, the discriminator network may be applied to a synthesized sensor data, e.g., a fake image. The fidelity-preserving transformation may be applied to the synthesized sensor data, and the discriminator network may be applied to the result. In this case, the original fake image and the transformed fake image should give the same discriminator output, e.g., that both are fake images. Thus, the difference between discriminator values may be minimized.

For example, one may use as a loss term:

$$1/(\|D(F(G(z)))-D(G(z))\|+\varepsilon), \text{ wherein}$$

ε represents a parameter,
D represents the discriminator network
G represents the generator network
F represents the fidelity-preserving transformation, and
z represents an input of the generator network.

The parameter E may be taken as 1. Note that the above term is large whenever $(\|D(F(G(z)))-D(G(z))\|+\varepsilon)$ is small. In these examples $\| \ldots \|$ denotes a norm, e.g., an L2 norm or Euclidian norm. Other options are possible.

In an embodiment of the present invention, the generator network may be configured for a domain translation task. For example, the generator network may be configured to receive measured sensor data from a first domain as input and wherein the generator network is trained to generate synthesized sensor data from a second domain. This can be used for many purposes. For example, the first and second domain correspond to a different time of day and/or of the year, and/or
the first and second domain indicate a type of environment of a vehicle, and/or
the first and second domain indicate a type of sensor data, and/or
the first and second domain indicate an occlusion or desocclusion.

For example, to test a machine learnable model on hard to obtain test data, e.g., sensor data corresponding with dangerous situations, e.g., crashes and near crashes, the generator may be applied to an example of the test data, and transfer it to a different domain, e.g., a slightly different domain. For example, types of cars may be changed, time of day or time of year may be changed, etc. Thus, measured sensor data obtained during a near collision, say around noon in spring, may be converted to synthesized sensor data corresponding to an evening in fall, yet still show a near collision. Using the synthesized sensor data, the machine learnable model may be tested for a wider range of near-collisions, this improving the safety of the autonomous Apparatus in which the machine learnable model is used.

Another way in which a trained generator network may be used, is to generate synthesized sensor data for which a given controller would take a rare action. For example, trained generator network may be used to generate a large set of synthesized sensor data, e.g., from a corresponding set of noise vectors and apply a controller of an autonomous apparatus to the set, e.g., to obtain a simulated control signal. A set of control signals may be selected therefrom according to a criterion, e.g., cases that indicate a dangerous situation, e.g., control signals that correspond to sharp breaking or sharp steering. Next the synthesized sensor data that correspond to the selected simulated control signals may be obtained and analyzed. In this way, one can quickly obtain synthesized sensor data for which the controller would take a particular action, e.g., a non-average action. For example, one may evaluate if the action taken is appropriate given the synthesized sensor data. Using measured sensor data, it is difficult to obtain test cases in which the controller takes a rare action, e.g., an emergency brake.

In an embodiment, the training set comprises ground-truth class-labels for the measured sensor data. A class-label may be provided as an additional input to the discriminator network. For example, the discriminator network may be a conditional network receiving the class label as input. Typically, a class label is also be provided as an additional input to the generator network, e.g., to indicate to the generator network to generate synthesized sensor data according to the class label. The latter is not necessary though, for example, a conditional discriminator network may be combined with multiple unconditional generator networks.

The class label indicates a class of the discriminator input data, the discriminator neural network being optimized to distinguish if the discriminator input data corresponds to the class. For example, the discriminator network may be trained to distinguish between measured sensor data with the correct class label on the one hand and synthesized sensors data or measured sensor data with an incorrect class label on the other hand.

The domain translation and data synthesis tasks can be performed between any sensor signals. However, as an example we focus mostly on images as the main application. The proposed framework can be also used for data augmentation as well as domain transfer tasks, e.g., from real samples to synthetic samples. The generated samples can be then used for training any data-driven method.

A class label may also be used for a generator network configured for a domain translation task. For example, in an embodiment, a class-label may indicate a transformation goal to the generator network. There may be a plurality of transformation goals, e.g., corresponding to a plurality of domains. The training data may be labeled with a domain of the plurality of domains. The generator network may be configured to transform measured sensor data to a domain according to the transformation goal. The discriminator network may be configured to determine if the input sensor data satisfies the domain according to the transformation goal.

In an embodiment of the present invention, a transformation goal may comprise a time difference; the training data may be labeled with a timestamp. The generator network may be configured to transform measured sensor data from a first timestamp to a second timestamp according to the time difference. The discriminator network may be configured to receive as input a first sensor data, a second sensor data and a time difference and to determine if the first sensor data and the second sensor data satisfy the time difference. Any one of the first and second sensor data may be synthesized data in which case, the discriminator network may be trained to reject the images. Measured sensor data labeled with a timestamp is relatively easy to obtain, e.g., by testing a controller and saving measured sensor data with a timestamp. By artificially changing the time of a particular measured sensor data, one can obtain a large amount of synthesized sensor data from a given measured sensor data of interest. For example, multiple time differences may be applied to the given measured sensor data.

An interesting application of sensor data translation is occlusion and desocclusion. The class label, e.g., a transformation goal may indicate an object which is to be occluded, e.g., moved behind another object, or to be desoccluded, e.g., moved in front of another object. For example, a pedestrian may be moved in front of or behind of a tree; a cyclist in front or behind a car, and so on. The discriminator network may be trained to verify if the object is indeed occluded or desoccluded. The class label in this case may be a map indicating the object to be occluded/desoccluded. In an embodiment, generator network and discriminator network receive data indicating an object in the sensor data, and indication if the object is to be occluded or desoccluded.

In an embodiment of the present invention, the generator network and/or the discriminator network comprise one or more neurons receiving at least part of the sensor data and optionally at least part of the class label, e.g., transformation goal. For example, the generator network and/or the discriminator network may be arranged to receive multiple channels as input, at least one of the channels encoding the sensor data; optionally at least one of the channels may encode for a class label or transformation goal. For example, the generator network and/or the discriminator network may comprise multiple layers.

The method of training a generator network may be used in a method to generate further training data for a machine learnable model. For example, the machine learnable model may be a classifier. For example, the machine learnable model may be configured to receive measured sensor data as input and to generate a classification of the measured sensor data as output. For example, the measured sensor data may be an image taken with an image sensor. For example, image may be of a produced part and the classification may be if the part is defective. For example, the measured sensor data may be an image taken in an environment of an autonomous apparatus and the classification may indicate if there is a dangerous situation. The machine learnable model may also be a neural network, but this is not necessary. The machine learnable model may use other techniques, e.g., SVM, random forests, and so on. The further training data may be used for training but may also or instead be used for testing.

For example, in accordance with an example embodiment of the present invention, a method may comprise obtaining an initial training set for the machine learnable model, the initial training set comprising measured sensor data obtained from a sensor, and training a generator network from the initial training set using an embodiment of the training method. The trained generator network may be applied to generate the further training data. The further training data may then be used for training and/or testing the machine learnable model at least on the further training data.

A further aspect of the present invention concerns a training system for training a generator neural network configured to generate synthesized sensor data. A further aspect of the present invention concerns a generator system for a generator neural network arranged to generate synthesized sensor data. A further aspect of the present invention concerns an autonomous apparatus, e.g., an autonomous vehicle. For example, the autonomous apparatus may be a computer-controlled machine, such as a robot, a vehicle, a domestic appliance, a power tool, a manufacturing machine.

Embodiments of the methods and/or systems in accordance with the present invention may be performed on one or more electronic devices. For example, the electronic device, may be a computer.

An embodiment of the methods in accordance with the present invention may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment of the present invention, the computer program comprises computer program code adapted to perform all or part of the steps of an embodiment of the method when the computer program is run on a computer. Preferably, the computer program is embodied on a computer readable medium.

Another aspect of the presently disclosed subject matter of the present invention is a method of making the computer program available for downloading.

BRIEF DESCRIPTION OF THE DRAWINGS

Further details, aspects, and embodiments will be described, by way of example only, with reference to the figures. Elements in the figures are illustrated for simplicity and clarity and have not necessarily been drawn to scale. In the figures, elements which correspond to elements already described may have the same reference numerals.

Figure 1A:
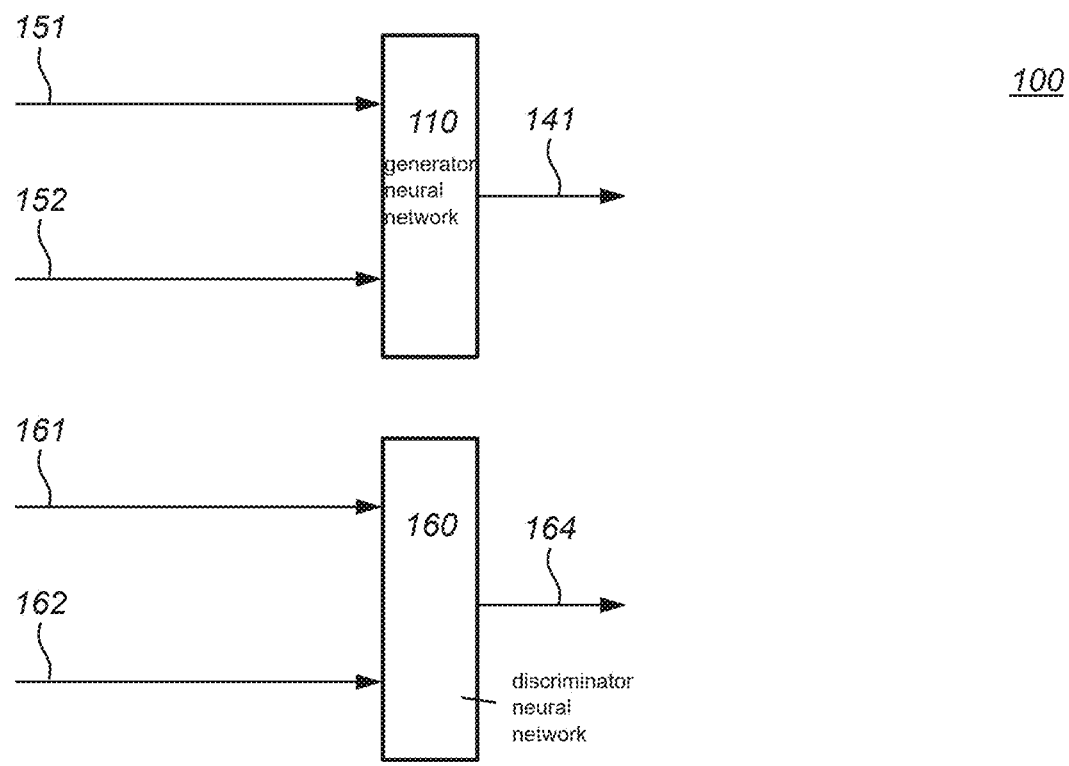
FIG. 1a schematically shows an example of an embodiment of a generator neural network and of a discriminator neural network, in accordance with the present invention.

LIST OF REFERENCE NUMERALS IN FIGS.
1a-2c, 4a-7b

The following list of references and abbreviations is provided for facilitating the interpretation of the figures and shall not be construed as limiting the present invention.

| | |
|---|---|
| 100 | a Generative Adversarial Network (GAN) |
| 110 | a generator neural network |
| 120 | an encoder part |
| 130 | a processing part |
| 140 | a decoder part |
| 141 | synthesized sensor data |
| 151 | generator neural network input |
| 152 | a class-label |
| 160 | a discriminator neural network |
| 161 | a discriminator neural network input |
| 162 | a class label |
| 164 | discriminator value |
| 161.1-161.5 | discriminator input |
| 164.1-164.5 | discriminator value |
| 180 | a measured sensor data |
| 181 | a fidelity-preserving transformation |
| 182 | a fidelity-destroying transformation |
| 183 | an equivariant transformation |
| 184 | a difference operation |
| 200 | a training system |
| 210 | an optimizer |
| 220 | a generator unit |
| 230 | a discriminator unit |
| 240 | a training set storage |
| 250 | a generator system |
| 252 | an input unit |
| 254 | an output unit |
| 260 | a training system |
| 263 | a processor system, |
| 264 | a memory |
| 265 | a communication interface |
| 401 | measured sensor data |
| 402 | fidelity-preserved transformed measured sensor data |
| 403 | fidelity-destroying transformed measured sensor data |
| 404 | synthesized sensor data |
| 405 | fidelity-preserved transformed synthesized sensor data |
| 501 | a first sensor data |
| 502 | a second sensor data |
| 511 | a mask |
| 531 | a composed image |
| 800 | an environment |
| 810 | a car |
| 810' | an autonomous car |
| 820 | a sensor system |
| 822 | a controller |
| 812 | a pedestrian |
| 830 | a first training database |
| 832 | a second training database |
| 840 | a training system |
| 842 | a generator system |
| 850 | a machine learning system |
| 852 | a classifier |
| 1000 | a computer readable medium |
| 1010 | a writable part |
| 1020 | a computer program |
| 1110 | integrated circuit(s) |
| 1120 | a processing unit |
| 1122 | a memory |
| 1124 | a dedicated integrated circuit |
| 1126 | a communication element |
| 1130 | an interconnect |
| 1140 | a processor system |

DETAILED DESCRIPTION OF EXAMPLE EMBODIMENTS

While the presently disclosed subject matter of the present invention is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them. Further, the subject matter that is presently disclosed is not limited to the embodiments only, but also includes every other combination of features described herein.

FIG. 1a schematically shows an example of an embodiment of a generator neural network 110 and of a discriminator neural network 160. Generator neural network 110 and discriminator neural network 160 are trained together as a GAN 100.

Generator network 110 may be configured to generate synthesized sensor data 141. The generator network may be optimized so that generated synthesized sensor data 141 is indistinguishable from measured sensor data by discriminator network 160. For example, that as far as discriminator network 160 can distinguish synthesized sensor data 141 appears as if it was drawn from measured sensor data.

Discriminator neural network 160 is optimized to distinguish between measured sensor data and synthesized sensor data. Discriminator neural network 160 may be configured to receive a discriminator neural network input 161. For example, discriminator neural network input 161 may comprise measured sensor data, e.g., sensor data obtained from a sensor. In this case, discriminator neural network 160 may distinguish the discriminator neural network input 161 as measured sensor data. For example, discriminator neural network input 161 may comprise synthesized sensor data, e.g., synthesized sensor data 141. In this case, discriminator neural network 160 may distinguish the discriminator neural network input 161 as synthesized.

G aims to map a latent variable z~p(z) sampled from a prior distribution to a realistic-looking image, e.g., like measured sensor data, while D aims to distinguish between a real x and generated G(z) images, e.g., between measured sensor data and synthesized sensor data. In an embodiment, G and D may be modeled as a decoder and an encoder convolutional network, respectively. For example, the discriminator may output a value between 1 and 0 to indicate how real the input seems.

Generator neural network 110 is configured to receive a generator neural network input 151 and to produce synthesized sensor data 141. The generator neural network input 151 may comprise a random element, e.g., noise, e.g., a noise vector, which may be used for generation of new synthesized sensor data.

Generator neural network input 151 may comprise measured sensor data; generator neural network 110 may be configured for a translation task, e.g., domain translation. For example, generator neural network input 151 may be configured to generate synthesized sensor data like generator neural network input 151 but in a different domain. For a domain translation task some kind of cycle regularization may be used during training. Cycle regularization may be obtained by using multiple generator networks, or by configuring the generator neural network as a conditional neural network, e.g., wherein a class label indicates the desired domain transfer. A CycleGAN is not necessary though.

Generator neural network 110 may be configured to receive an additional input: class label 152, but this is optional. Class label 152 indicates a desired property of synthesized sensor data 141, e.g., a desired domain. There may be more than one class label. Input 152 is optional.

Discriminator network 160 may be configured to receive an additional input: a class label 162. In case a class label 162 is used, the discriminator network may additionally verify if the discriminator input 161 is according to the class label. For example, discriminator network 160 may only output an 'is-real' output, e.g., a discriminator value of 1, in case the discriminator input 161 is both measured sensor data and according to the class label.

Discriminator network 160 may be configured to produce a discriminator value 164. For example, the discriminator value 164 may indicate if the discriminator input 161 appears to be measured sensor data, e.g., output 1, or synthesized sensor data, e.g., output 0. A value in between may indicate an uncertainty about the image.

Figure 1B:
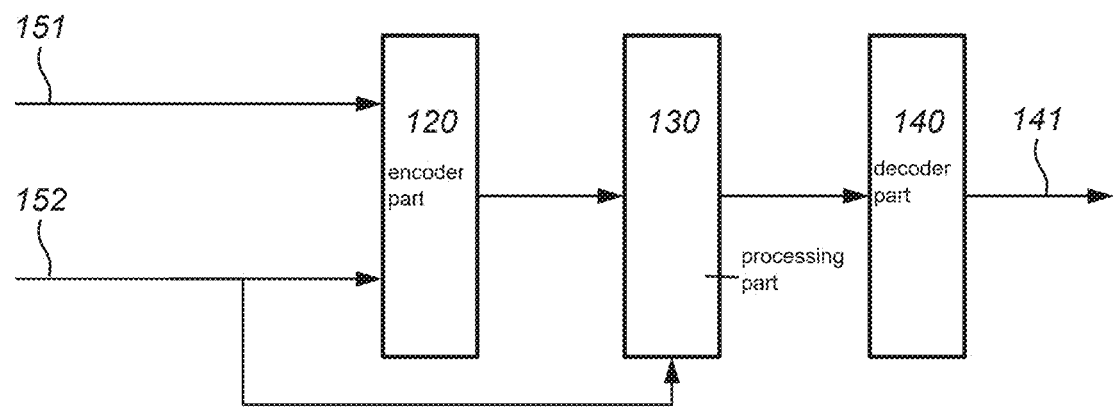
FIG. 1b schematically shows an example of an embodiment of a generator neural network, in accordance with the present invention.

FIG. 1b schematically shows an example of an embodiment of a generator neural network. In this embodiment, the generator neural network receives measured sensor data as part of the input 151; this is not necessary, e.g., noise may be used instead or in addition. FIG. 1b also show a class label 152 as input; this input is optional.

The generator network of FIG. 1b comprises three parts: an encoder part 120, a processing part 130 and a decoder part 140.

Encoder part 120 is configured to receive the input sensor data 151. Encoder part 120 may be configured with a so-called bottleneck at its output. Processor part 130 receives the output of the encoder part 120, decoder part 140 may receive the output of the processing part. The optional class-label 152, may comprise a transformation goal which is to be applied to one or more parts of the input. As shown in FIG. 1, the class-label 152 is provided as input to the encoder part and as an input to the processing part. Although not shown in FIG. 1b, it was found to be particularly advantageous to supply the transformation goal as an input to the decoder part 140 as well.

In an embodiment, the class-label could be an input to the decoder part 140. In an embodiment, the class-label could be an input to the decoder part 140 and to the encoder part 130.

In an embodiment, encoder part 120 comprises multiple convolution layers, processor part 130 comprises multiple residual layers and the decoder part comprises multiple convolution layers. Various conventional types of layers may be added. For example, in an embodiment, encoder part 120 comprises 5 convolution layers, processor part 130 comprises 4 residual layers and the decoder part comprises 5 convolution layers. The network may be larger or smaller as desired or may even be much larger.

Discriminator neural network 160 may use a conventional architecture, e.g., an encoder network or down sampling network. The architecture of discriminator neural network 160 may be the same as encoder 120 except that output discriminator 160 needs only to be one bit. In an embodiment, the output discriminator 160 could be more detailed than one bit.

Figure 1C:
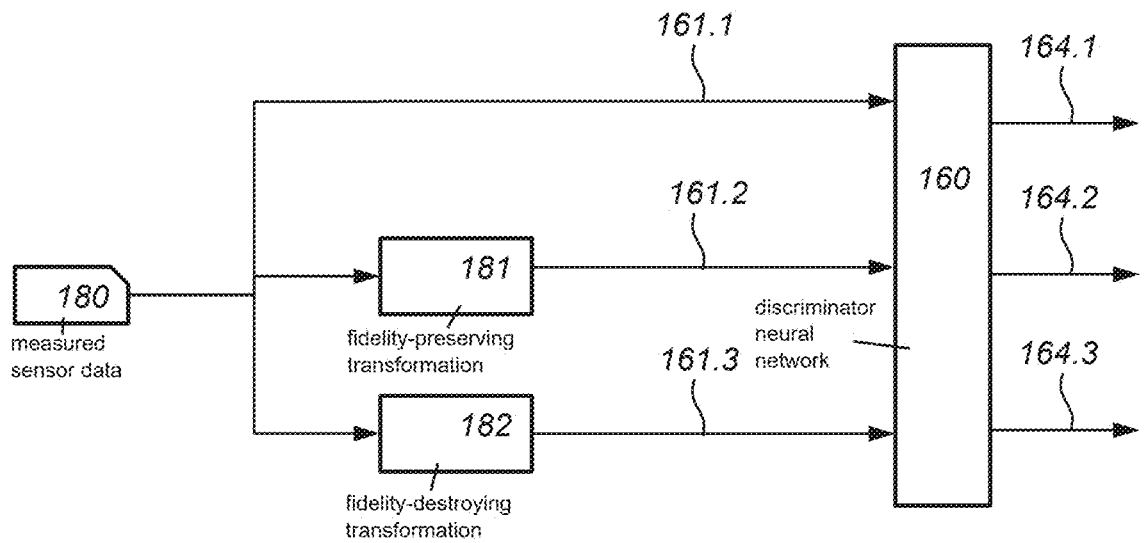
FIG. 1c schematically shows an example of an embodiment of a discriminator neural network, in accordance with the present invention.

FIG. 1c schematically shows an example of an embodiment of a discriminator neural network.

Training of GAN 100 may use conventional GAN training methods with the addition of additional training data and/or additional loss terms in the optimization. FIG. 1c shows a measured sensor data 180. The measured sensor data 180 may be provided to discriminator 160 as input 161.1 to obtain a discriminator output, e.g., a value 164.1. For example, discriminator 160 may be optimized so that the corresponding discriminator 160 output 164.1 indicates measured sensor data, e.g., an output of 1.

Additional training data may be obtained by applying a transformation to measured sensor data 180.

FIG. 1c shows a fidelity-preserving transformation 181. Fidelity-preserving transformation 181 may be applied to measured sensor data 180. The resulting sensor data should not be distinguishable from real measured sensor data. When discriminator 160 is applied to the transformed measured sensor data 180 as input 161.2, a value 164.2 is obtained. Thus, one may optimize discriminator 160 that the corresponding output 164.2 indicates measured training data, e.g., also a value of 1. Instead of directly optimizing the latter on could instead optimize discriminator 160 to minimize the difference between the two values 164.1 and 164.2. This has the advantage that from early iterations, the discriminator is trained to produce equivariant outputs—even if the discriminator values themselves are not very accurate yet.

Fidelity-destroying transformation 182 may be applied to measured sensor data 180. The resulting sensor data should be distinguished from real measured sensor data. When discriminator 160 is applied to the transformed measured sensor data as input 161.3, a value 164.3 is obtained. Thus, one may optimize discriminator 160 that the corresponding output 164.3 indicates not measured training data, e.g., a value of 0, e.g., the same value as for synthesized sensor data. Instead of directly optimizing the latter on could instead optimize discriminator 160 to maximize the difference between the two values 164.1 and 164.3.

The two loss terms may be combined so that a single loss term can be optimized, e.g., as a ratio. This has the effect of balancing the above two loss terms.

Figure 1D:
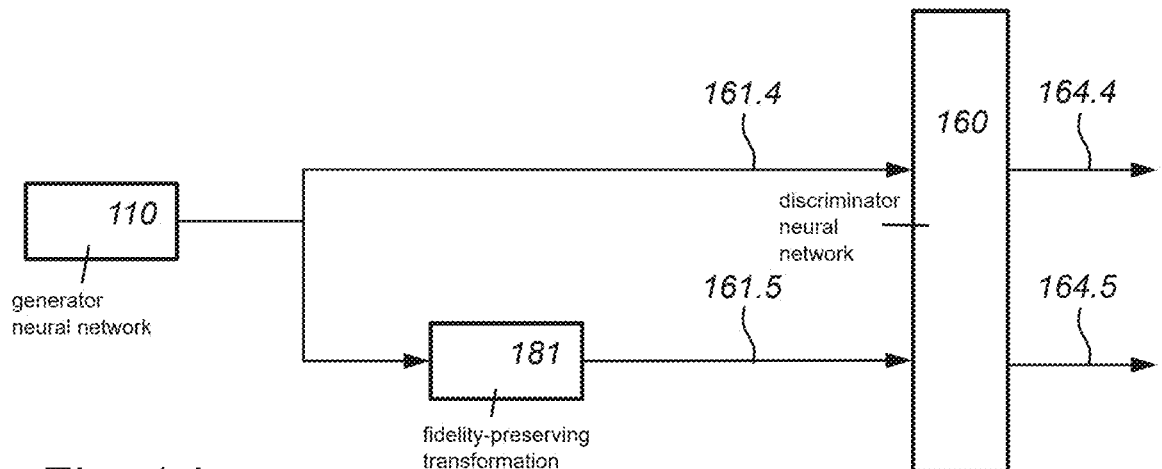
FIG. 1d schematically shows an example of an embodiment of a discriminator neural network, in accordance with the present invention.

FIG. 1d schematically shows an example of an embodiment of a discriminator neural network.

Training of GAN 100 may use conventional GAN training methods with the addition of additional training data and/or additional loss terms in the optimization. FIG. 1d shows generator neural network 110, the output of which may be provided to discriminator network 160 as input 161.4 to obtain output 164.4. For example, discriminator 160 may be optimized so that the corresponding discriminator 160 output 164.4 indicates synthesized sensor data, e.g., an output of 0.

Additional training data may be obtained by applying a transformation to the synthesized sensor data. FIG. 1c shows the fidelity-preserving transformation 181. Fidelity-preserving transformation 181 may be applied to the synthesized sensor data. The resulting sensor data should still be distinguished from measured sensor data. When discriminator 160 is applied to the transformed synthesized sensor data as input 161.5, a value 164.5 is obtained. Thus, one may optimize discriminator 160 so that the corresponding output 164.5 indicates synthesized training data, e.g., also a value of 0. Instead of directly optimizing the latter one could instead optimize discriminator 160 to minimize the difference between the two values 164.4 and 164.5 FIG. 1e schematically shows an example of an embodiment of a generator neural network.

Figure 1E:
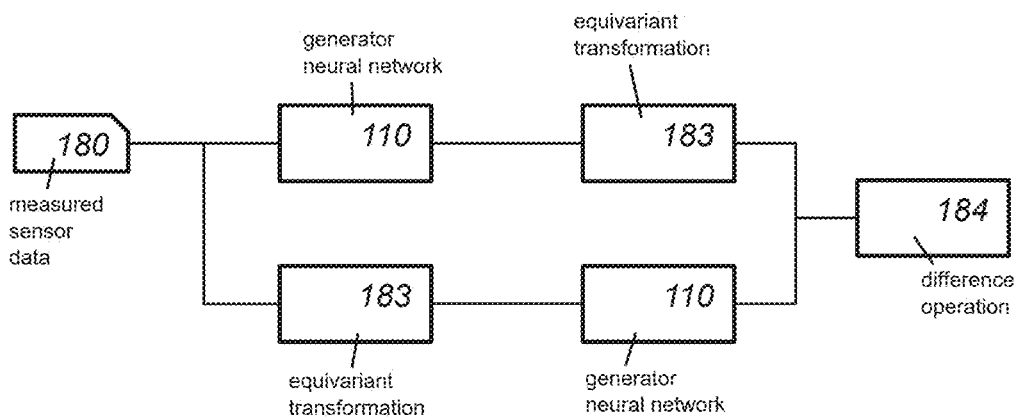
FIG. 1e schematically shows an example of an embodiment of a generator neural network, in accordance with the present invention.

Shown in FIG. 1e is sensor data 180, typically measured sensor data. For example, sensor data 180 may comprise an image. In the embodiment, generator neural network 110 is configured to take sensor data as input and to produce synthesized sensor data as output. For example, generator neural network 110 may be configured for an image translation task, e.g., a domain transfer. Generator neural network 110 may be configured to receive a class label as additional input, e.g., a transformation goal, but this is optional. Also shown in FIG. 1e is an equivariant transformation 183. For example, equivariant transformation 183 may be a fidelity preserving transformation. For example, equivariant transformation 183 may be a small rotation, e.g., a rotation angle below a threshold, or a mirroring over a vertical axis, etc. Shown in FIG. 1e in the top row is that generator neural network 110 is first applied to sensor data 180 followed by equivariant transformation 183. Shown in FIG. 1e in the bottom row is that equivariant transformation 183 is first applied to sensor data 180 followed by generator neural network 110. The equivariant transformation 183 is chosen so that the two rows should give the same result. The two images are compared in difference operation 184. For example, they may be compared pixel by pixel and the differences may be summed. For example, this may be a sum of squared differences. Generator network 184 may be optimized to minimize the difference. And advantage of this operation is that the generator network can be optimized directly, without having to go through the discriminator network. Moreover, from an early stage in training the generator network can be trained to respect the equivariance. Note that the type of equivariancy that is obtained in this way may be difficult or impossible to obtain by adapting the architecture of the generator neural network.

Generally, e.g., in FIGS. 1a-1e, there may be multiple fidelity preserving, fidelity destroying and equivariant transformations. For example, if the transformation comprises a rotation, the rotation may be selected randomly, e.g., selected randomly from a range. A transformation may be used for a single loss term, but if strong equivariance learning is desired, multiple loss terms may be introduced, e.g., using multiple transformations of the various types.

Figure 2A:
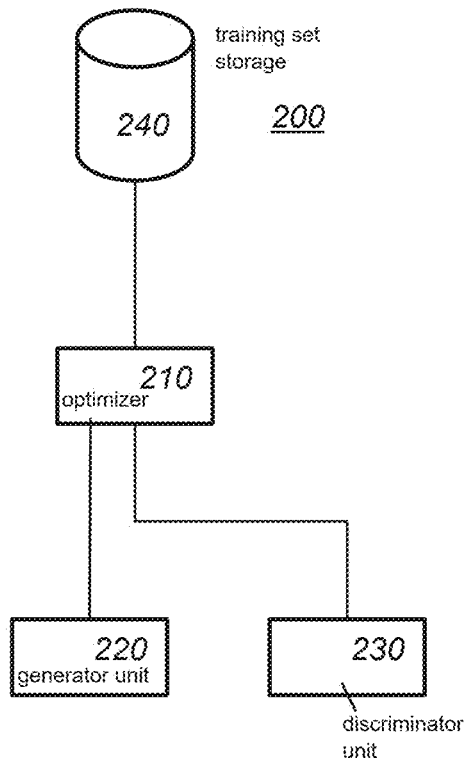
FIG. 2a schematically shows an example of an embodiment of a training system, in accordance with the present invention.

FIG. 2a schematically shows an example of an embodiment of a training system 200. Training system 200 is configured for training a generator neural network arranged to transform measured sensor data into synthesized sensor data. For example, system 200 may comprise a generator unit 220 configured for applying the generator neural network, and a discriminator unit 230 configured for applying a discriminator neural network. For example, generator unit 220 and/or discriminator unit 230 may comprise storage for storing parameters of the respective neural networks. For example, generator unit 220 and/or discriminator unit 230 may be configured to receive network inputs, apply the inputs and the parameters according to the neural network type and to provide the network result on an output.

System 200 comprises an optimizer 210. Optimizer 210 is configured to train the generator network together with the discriminator neural network. The generator network is optimized to generated synthesized sensor data, and the discriminator network is optimized to distinguish between measured sensor data and synthesized sensor data. In order to train the two neural networks, optimizer 210 has access to a training set, e.g., as stored in a training set storage 240. The training set comprises measured sensor data. Sensor data may be image data, e.g., images, but may comprise instead or in addition a wide variety of data, e.g., radar data, ultrasonic sensor data, etc. In an embodiment, sensor data may be obtained from a sensor configured to produce two-dimensional data characterizing an environment of the sensor. The sensor may be employed in a machine. In an embodiment, at least part or all of the sensor measurements have domain information and/or sensor time information indicating the domain in which the condition, e.g., the environment or environment type, and/or the time when the sensor data was obtained.

Optimizer 210 may apply one or more transformation to the measured sensor data and/or to synthesized sensor data to augment the training set. In this way, it may be enforced that the resulting neural networks have desired equivariant properties.

A sensor data may be a multiple of conjoint sensor data, possibly of different sensor modalities. For example, in the example of autonomous vehicles one sensor data item may comprise, one or more of image, radar, and other sensor data, typically concurrent data recorded from multiple sensors. For example, system 200 may comprise a communication interface for accessing the training set. Sensor data may be measured, e.g., as received from a sensor, e.g., real, or true; or sensor data may be generated, e.g., as generated by a generator unit, e.g., fake.

Figure 2B:
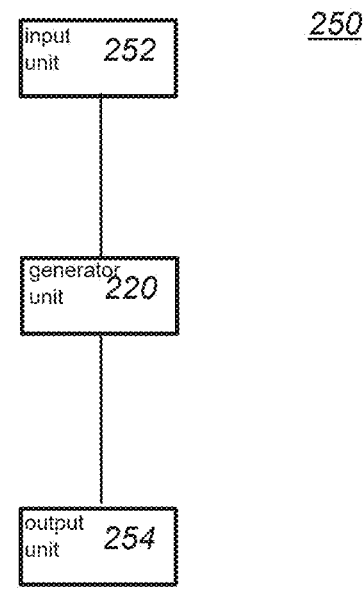
FIG. 2b schematically shows an example of an embodiment of a generator system, in accordance with the present invention.

Once the generator network is sufficiently trained, e.g., after convergence or after exhausting the training data, or after a preset number of training iterations, the generator network may be used in an application, typically without the corresponding discriminator network. For example, FIG. 2b schematically shows an example of an embodiment of a generator system 250. Generator system 250 is configured to apply a generator neural network, such as the generator neural network trained by system 200, e.g., the generator neural network of generator unit 220. Generator system 250 is thus arranged to generate synthesized sensor data. System 250 may comprise an input unit 252. Input unit 252 may be configured for receiving as input measured sensor data, e.g., in case of a domain transferring task. Input unit 252 may be configured for receiving a noise component, e.g., in case of a generating task. Input unit 252 may be configured for both noise and sensor data as well. Input unit 252 might also be used to receive sensor data that was not measured but generated. After generating the synthesized sensor data, the generated output sensor data may be put on output 254, e.g., transmitted. For example, system 250 may comprise a communication interface for receiving and/or transmitting the sensor data.

System 250 comprises a generator system 220 configured to apply the trained generator network to the received input measured sensor data. Typically, system 250 is configured to perform further tasks. For example, system 250 may be configured to augment further training data for a further neural network, e.g., for a classifier. System 250 and system 200 may be the same system, or they may not be. Systems 200 and/or 250 may be a single device or may comprise multiple devices.

Systems 200 and/or 250 may communicate with each other or with external storage or input devices or output devices over a computer network. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna, etc.

The execution of system 200 and 250 is implemented in a processor system, e.g., one or more processor circuits, examples of which are shown herein. FIGS. 1a, 1b, 1c, 1d, 2a and 2b show functional units that may be functional units of the processor system. For example, FIGS. 1a-2b may be used as a blueprint of a possible functional organization of the processor system. The processor circuit(s) are not shown separate from the units in these figures For example, the functional units shown in FIGS. 1a-2b may be wholly or partially implemented in computer instructions that are stored at system 200 and 250, e.g., in an electronic memory of system 200 and 250, and are executable by a microprocessor of system 200 and 250. In hybrid embodiments, functional units are implemented partially in hardware, e.g., as coprocessors, e.g., neural network coprocessors, and partially in software stored and executed on system 200 and 250. Parameters of the network and/or training data may be stored locally, e.g., at system 200 and 250, or may be stored in cloud storage.

Figure 2C:
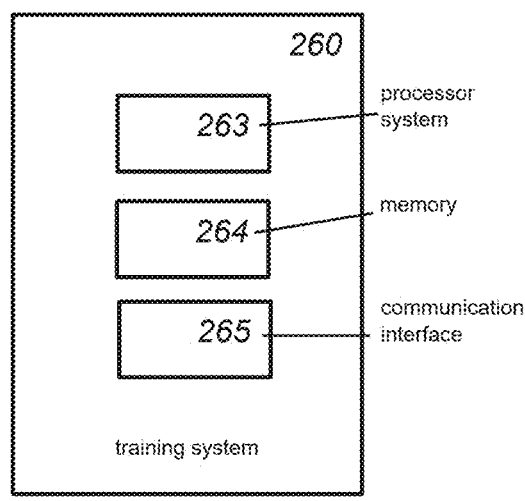
FIG. 2c schematically shows an example of an embodiment of a training system, in accordance with the present invention.

FIG. 2c schematically shows an example of an embodiment of a training system 260. Training system 260 may comprise a processor system 263, a memory 264, and a communication interface 265. For example, the execution of system 200 may be implemented in a processor system, e.g., one or more processor circuits, e.g., microprocessors, examples of which are shown herein. Parameters of the networks and/or training data may be stored locally at system 260 or may be stored in cloud storage.

Figure 3:
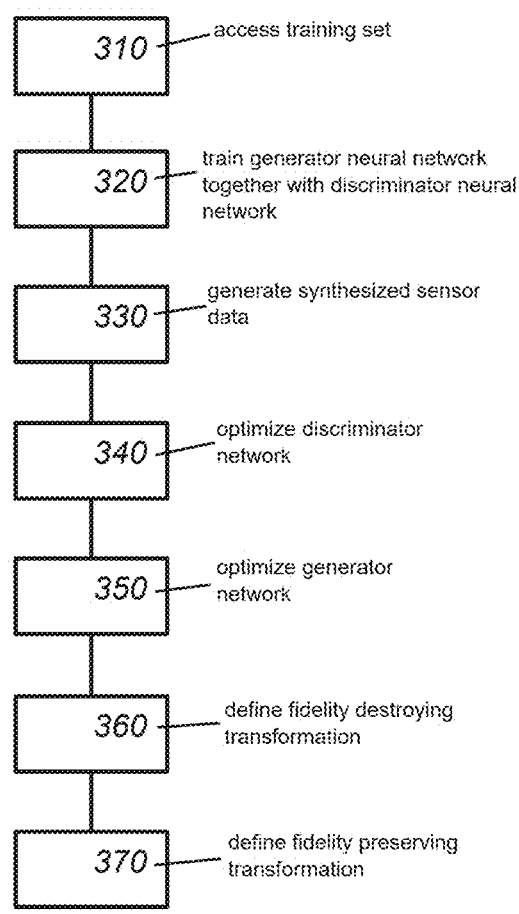
FIG. 3 schematically shows an example of an embodiment of a training method, in accordance with the present invention.

FIG. 3 schematically shows an example of an embodiment of a training method 300. Method 300 is a training method for training a generator neural network configured to generate synthesized sensor data. Method 300 comprises accessing (310) a training set (351; 352; 353) of measured sensor data obtained from a sensor, training (320) the generator network together with a discriminator neural network (230; 238; 239), wherein the training comprises generating (330) synthesized sensor data using the generator neural network, optimizing (340) the discriminator network to distinguish between measured sensor data and synthesized sensor data, optimizing (350) the generator network to generate synthesized sensor data which is indistinguishable from measured sensor data by the discriminator network, wherein a fidelity destroying transformation is defined configured to transform a measured sensor data to obtain (360) a fidelity-destroyed transformed measured sensor data, the training comprising optimizing the discriminator network to distinguish between measured sensor data and fidelity-destroyed transformed measured sensor data, and/or a fidelity preserving transformation is defined configured to transform a measured sensor data to obtain (370) a fidelity-preserved transformed measured sensor data, the training comprising optimizing the discriminator network not to distinguish between measured sensor data or fidelity-preserving transformed measured sensor data.

In the various embodiments of system 100, 200 and 250, one or more communication interfaces may be selected from various alternatives. For example, the interface may be a network interface to a local or wide area network, e.g., the Internet, a storage interface to an internal or external data storage, a keyboard, an application interface (API), etc.

The systems 100, 200 and 250 may have a user interface, which may include conventional elements such as one or more buttons, a keyboard, display, touch screen, etc. The user interface may be arranged for accommodating user interaction for configuring the systems, training the networks on a training set, or applying the system to new sensor data, etc.

Storage may be implemented as an electronic memory, say a flash memory, or magnetic memory, say hard disk or the like. Storage may comprise multiple discrete memories together making up the storage, e.g., storage 264, 240, etc. Storage may comprise a temporary memory, say a RAM. The storage may be cloud storage.

Systems 100, 200 or 250 may be implemented in a single device. Typically, the systems 100, 200 and 250 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems 100, 200 and 250 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 4A:
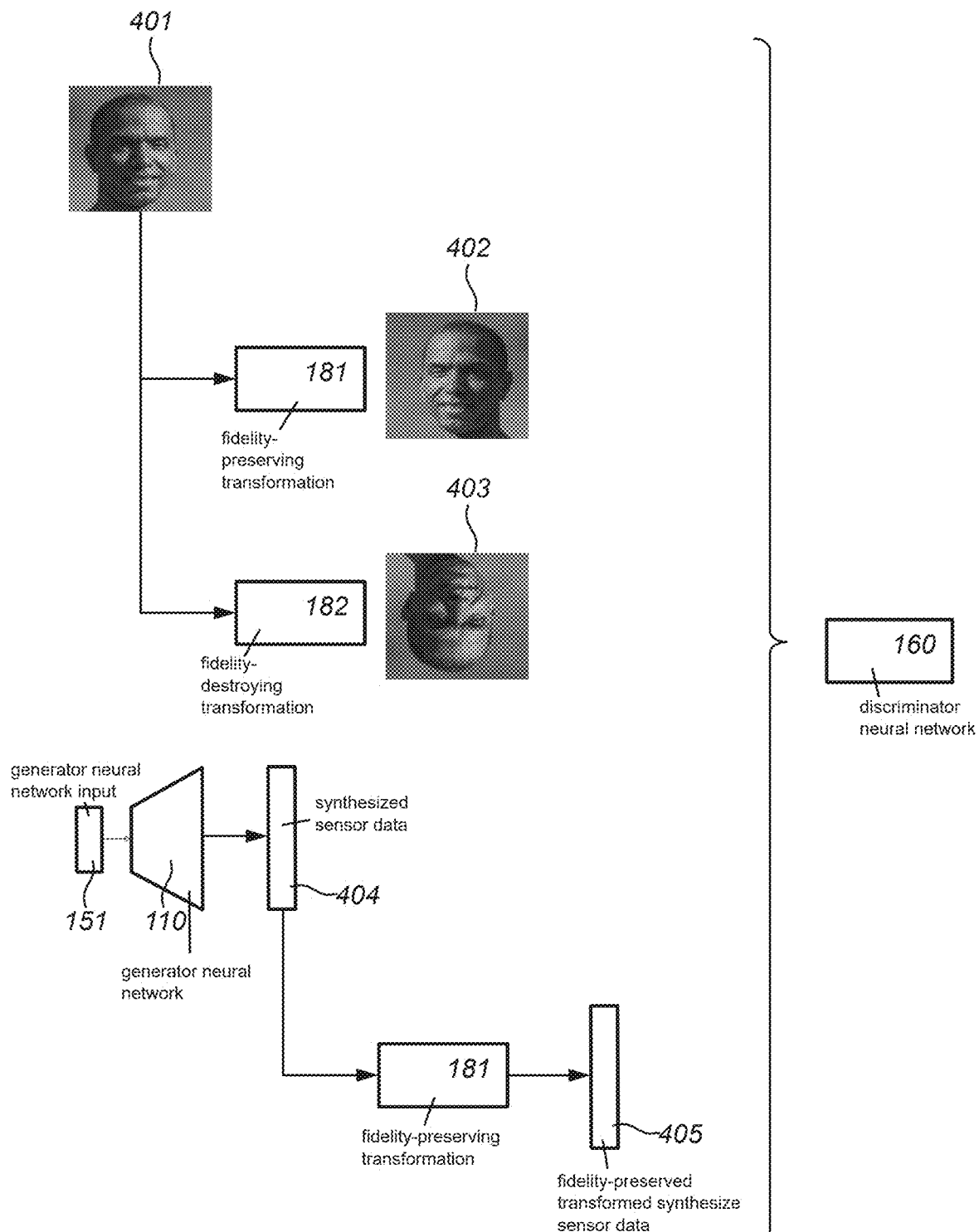
FIG. 4a schematically shows an example of an embodiment of a training system, in accordance with the present invention.

FIG. 4a schematically shows an example of an embodiment of a training system. Shown in FIG. 4a is a measured sensor data 401, in this case an image of a person, but data 401 could be other sensor data, e.g., a street scene, a manufactured product, etc., the sensor modality may be different as well.

A fidelity-preserving transformation 181, F may be applied to measured sensor data 401. In this case, a vertical mirroring, e.g., a mirror operation over the vertical axis. It is the intention that the discriminator learns that such an operation should not change it classification. The result is a fidelity-preserved transformed measured sensor data 402. Likewise, a fidelity-destroying transformation 182, T may be applied to measured sensor data 401. In this case a horizontal mirroring operation is applied. The discriminator may thus be trained that this operation will remove the data, e.g., data 401 from its domain.

Also shown in FIG. 4a is a generator 110. The generator receives as input at least input 151. Input 151 may comprise a noise vector, but may also or instead comprise sensor data, in particular measured sensor data. The result is synthesized sensor data 404. The latter may be used to train the discriminator that such data is not real, e.g., fake. The fidelity-preserving transformation 181 may be applied to the synthesized sensor data 404. The latter may be used to train that discriminator that data 404 and 405 should receive the same classification.

The discriminator 160 may be applied to all of the data, 401, 402, 403, 404 and 405. For example, the discriminator 160 may be taught that 401 is real, and 404 is fake. The discriminator may be taught that the difference in classification between 401 and 402 should be small, between 401 and 403 should be large, and between 404 and 405 should be small. These differences could be optimized for directly, they can also be combined in one or more loss terms.

Figure 4B:
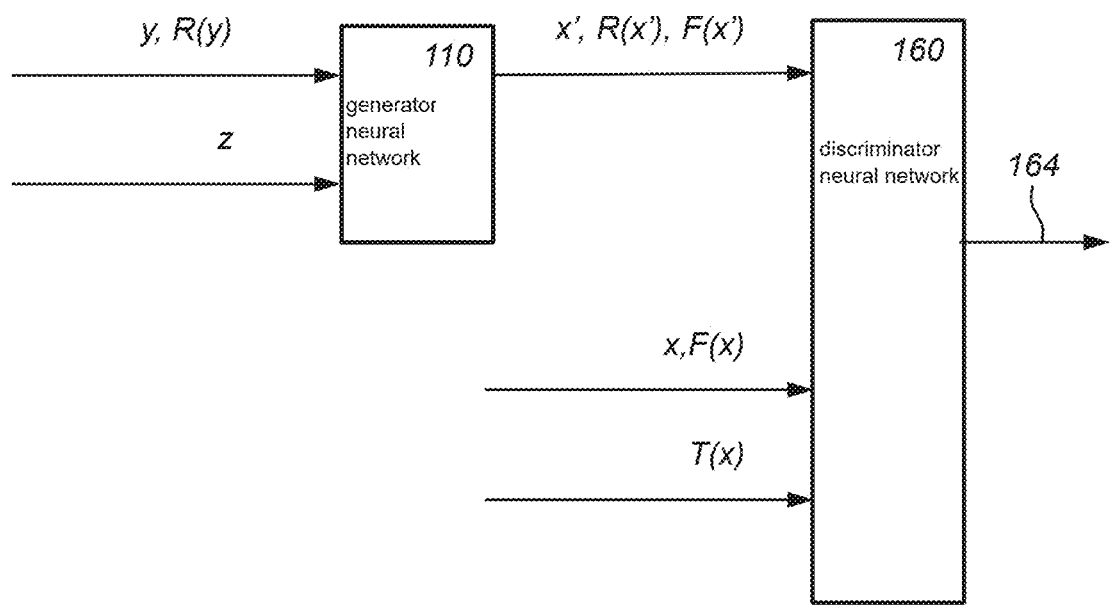
FIG. 4b schematically shows an example of an embodiment of a training system, in accordance with the present invention.

FIG. 4b may be applied to a GAN or to a cGAN, for example, image 401 may be provided in a training set together with a class label. The same class label may be used for images 402 and 403. Input 151 may comprise a class label, which may be used for images 404 and 405. Discriminator 160 may receive an image of 401-405 together with the corresponding class label. The discriminator may in addition to judging the realness of an image also judge the appropriateness of the class label. Otherwise the same loss functions may be used.

In case the generator 110 is trained for a domain translation task, e.g., if input 151 comprises measured sensor data, e.g., an image, then equivariancy may also be directly trained for the generator. For example, given an equivariant function R, e.g., a fidelity-preserving function, one may require that $G(R(x))$ is close to $R(G(x))$, e.g., by averaging squared pixel differences. This provides an additional loss term that can be directly applied to G.

Below several further optional refinements, details, and embodiments are illustrated. Below it is often assumed that the measured and synthesized sensor data comprise an image. This is not necessary however, instead of an image sensor another type of sensor may have been used to obtain the measured sensor data; such different sensor data may also be used in addition to image sensor data.

The domain translation and data generation tasks with additional supervision as in an embodiment for generator and/or discriminator can be performed in principle between any sensor signals. It is noted that the embodiments below can be adapted to different sensor modalities, e.g. radar sensor data instead of images.

Embodiment can be used for data augmentation as well as domain transfer tasks. Generated samples can be used for training any data-driven methods.

In an embodiment, GAN and cGAN models are trained with additional supervision, such as the proposed data symmetry loss formulations for the generator and discriminator.

In an embodiment, a GAN comprises at least two neural networks, respectively modelling the discriminator and the generator. The generator G may take z as the input and may synthesize x'. The discriminator D may take the input x and/or x' as input to classify it into real and fake samples.

In an embodiment, a cGAN comprises at least two neural networks, respectively modelling the discriminator and the generator. The generator G may take (y, z) as the input and may synthesize x'. The discriminator D may take the input (x,y) and/or (x',y) to classify it into real and fake samples. For example, in this case, z may comprise a noise vector, x may comprise real measured sensor data, and x' fake synthesized sensor data. The input y may comprise additional information such as a class label, an image from another domain or label map.

Conventionally, the following objectives may be used:

GAN objective: $\min_G \max_D L_{GAN}(G,D)=E_{x \sim pdata(x)}[\log D(x)]+E_{z \sim pz(z)}[\log(1-D(G(z)))]$. The goal may be to learn a mapping from random noise vector z to output a sample (e.g. image) x, $G: z \to x$.

cGAN objective: $\min_G \max_D L_{cGAN}(G,D)= E_{x \sim pdata(x), y \sim pdata(y)}[\log D(X,y)]+E_{z \sim pz(z), y \sim pdata(y)}[\log(1-D(G(y,z)))]$. The goal may be to learn a mapping from the conditional information y, e.g., a class label, an image from another domain or label map, and random noise vector z to output a sample (e.g. image) x, $G:\{z,y\} \to x$. Thus, instead or in addition of noise input z, the input maybe a measured image.

A transformation F is defined which doesn't alter the domain (sample identity) of the data $x \in X$, $F(x) \in X$. For example, if x is an image, then F can be an affine transformation applied to x. The discriminator decision should not be altered by the transformation F applied on x: $D(x)=D(F(x))$, e.g., D's decision should be invariant to the transformation F. The transformation may be referred to as 'fidelity preserving' or 'domain preserving' or 'distribution preserving' because by applying the transformation F, the resulting image still appears real, still seems to belong to the domain of the original images, and can still be regarded as drawn from the same probability distribution.

A transformation T is defined which does alter the domain of the data $x \in X$, $T(x) \notin X$. For example, if x is an image, then T can be a severe blurring or perturbation of pixels applied to x. In this case, the discriminator decision should be altered by transformation T on x: $D(x) \neq D(T(x))$. The transformation may be referred to as 'fidelity destroying' or 'domain destroying' or 'distribution destroying' because by applying the transformation T, the resulting image no longer appears real, no longer seems to belong to the domain of the original images, and cannot be regarded as drawn from the same probability distribution.

The functions F and T provide additional prior knowledge to the training without having to change the architecture of the neural network. For example, the preserving transformation can be used to train the network that particular variations are within the range of the expected distribution of the images. The destroying transformation can be used to train the network that certain changes are not expected.

Thus, in an embodiment, these data symmetry properties may be used to add additional supervision to the discriminator:

For example, on may define a loss function term: $L_{D(x)\_data\_symmetry\_prior}(D,F,T)=E_{x \sim pdata(x)}[(\alpha \|D(T(x))-D(x)\|+1)/(\beta\|D(F(x))-D(x)\|+\varepsilon)]$, where |iii can be any $L_p$ norm (e.g. $L_1$) or any distance measure, and $\alpha$, $\beta$ and $\varepsilon$ are tunable hyperparameters.

Note that the value $\|D(T(x))-D(x)\|$ will go to 1 if the discriminator perfectly classifies the real image x, and the destroyed image T(x); For instance, one may have $D(x)=1$ and $D(T(x))=0$ for a real image x. Note that the value $\|D(F(x))-D(x)\|$ will go to 0 if the discriminator perfectly classifies the real image x and the preserved image F(x). For instance, one may have $D(x)=1$ and $D(F(x))=1$ for a real image x. In both cases, even if the value produced by discriminator D is not correct, e.g., 1 or 0 for a real or fake image, then the loss terms still instill equivariant properties in the discriminator.

The aim of the generator is to generate a data sample $x'=G(z)$, $z \sim P(z)$, in such way that the discriminator would classify it as a real data sample. The aim of the discriminator is to classify x' as a synthetic sample. Under the fidelity-preserving transformation F, these properties of the generated samples should be preserved as well. Accordingly, one may further include a loss term like: $L_{D(G)\_data\_symmetry\_prior}(D,G,F)=E_{z \sim p(z)}[1/(\|D(F(G(z)))-D(G(z))\|+\varepsilon)]$. Note that the term $\|D(F(G(z)))-D(G(z))\|$ will tend towards 0 for a well-trained discriminator and/or generator, and so 1-over that term will tend to become large in that circumstance.

The new discriminator objective may be: $\max_D [LGAN(G,D)+\lambda_1 LD(x)\_data\_symmetry\_prior(D,F,T)+ \lambda_2 LD(G)\_data\_symmetry\_prior(D,G,F)]$, where $\lambda_1$ and $\lambda_2$ control the relative importance of the two objectives. For example, one may choose $\lambda_1$, and $\lambda_2$ as 1.

In case of the conditional GAN case, particularly for image to image and label map to image translations the same data symmetry properties can be used to train the generator. For example, a generator objective may be to map y to x, $G:\{z,y\} \to x$. For example, in particular the input y may comprise an image from another domain. In an embodiment, y may also or instead comprise a label map.

Consider a transformation R to be such that the transformation function does not alter the domain of $y \in Y$, $R(y) \in Y$, e.g., R can be a rotation operation. Thus the transformation applied on y, R(y), should be preserved in the generated sample $x'=G(R(y),z)$ as well. Using the equivariance property under the transformation $R:G(R(y),z)=R(G(y,z))$, we can formulate a new loss for the generator:

$L_{G\_data\_symmetry\_prior}(G,R) = E_{z \sim p(z),\ y \sim pdata(y)}[\|G(R(y),z) - R(G(y,z))\|]$, where $\|\ \|$ can be any $L_p$ norm (e.g., $L_1$) or any distance measure. Note that the difference in $G(R(y),z) - R(G(y,z))$ is computed in the sensor data space, e.g., on images. The rotation may be limited to small rotations, e.g., below a threshold. For example, first performing a vertical mirroring operation and then performing the mapping of G should be the same as a vertical mirroring operation after first performing the mapping of G.

Note that if G has been trained to be equivariant, than $G(R(y),z) - R(G(y,z))$ should be small. A new generator objective may be:

$$\min_G [L_{GAN}(G,D) + \lambda_1 L_{D(x)\_data\_symmetry\_prior}(D,F,T) + \lambda_2 L_{D(G)\_data\_symmetry\_prior}(D,G,F) + \lambda_3 L_{G\_data\_symmetry\_prior}(G,R)],$$

where $\lambda_{1,2,3}$ control the relative importance of the objectives; they may be taken as 1. Note that the first term does not depend on G, so it can be omitted if this is only used as the generator objective.

FIG. 4b schematically shows an example of an embodiment of a training system, in this case a cGAN. In these embodiments, y may represent an image that is to be transformed according to a noise vector z.

FIG. 4b shows a generator 110 and a discriminator 160. The discriminator may be configured to receive as input a pair (x,y) or a pair (x',y), and decide if x/x' is real based on y.

Generator 110 is applied to two inputs (y, z) and to (R(y), z). The outputs include $x'=G(y,z)$. From the latter R(x') is computed which may be used to compute the G-specific loss term for the equivariant R shown above, that is G(R(y), z) and R(G(y,z)) should be close. Note that the discriminator need not be applied to G(R(y), z) or to R(G(y,z)); although it could, e.g., as additional synthesized training data, or an additional pair of synthesized sensor data versus fidelity-preserved transformed synthesized sensor data (e.g., x' and R(x')).

Also computed is F(x'). The discriminator is applied to F(x') and x' which may be used to compare the discriminator classifications of x' and F(x'). It is expected that the discriminator should work equally well on F(x') as on x'. Discriminator 160 may be trained on the difference between the classifications of F(x') and x', which should be small, or on the output directly, which should both be fake.

The discriminator may further be applied on x, F(x) and T(x), e.g., with the loss terms as indicated above. For example, a loss term may drive discriminator values for x and T(x) apart, but for x and F(x) together.

A further example of a fidelity-destroying transformation is a perturbation of a given real image, wherein the perturbation area is large enough, e.g., having an area larger than threshold, to destroy the local/global information in the image.

Further examples of a fidelity-destroying transformation are composed images, in particular, CutMix operations. For example, one way to compose sensor data, e.g., images, is to cut and paste one or more patches from images of different classes, e.g., real and fake. For example, the transformation may be the so-called CutMix transformation of real and fake samples. An advantage of CutMix in the context of GAN training is that it does not alter the real and fake image patches used for mixing, preserving their original class domain, and provides a large variety of possible outputs. We visualize the CutMix augmentation strategy in FIG. 5, e.g., between 20% and 80%.

For example, for the T transformation, one may compose two real-images, or a real and a synthesized image. The discriminator may be trained to classify it as not-real because of the global inconsistencies.

Figure 5A:
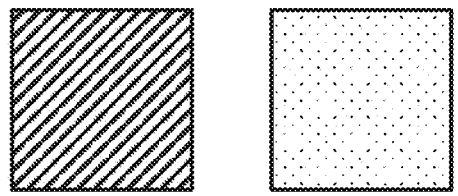
FIG. 5a schematically shows examples of an embodiment of data in an embodiment of a training method, in accordance with the present invention.
Figure 5A:
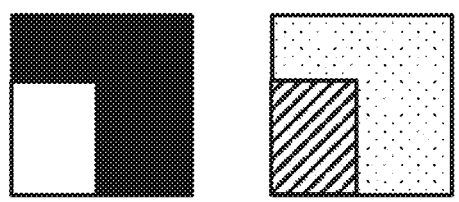

FIG. 5a schematically shows examples of an embodiment of data in an embodiment of a training method. FIG. 5 shows a schematic visualization of the CutMix transformation.

The first row of FIG. 5 shows a real image 501, e.g., measured sensor data, and a fake image 502, e.g., synthesized sensor data. The second row shows binary masks M, which may be used for the CutMix operation. In this row of FIG. 5 a white color is used for real, and a black color for fake. Mask 511 will cause the majority of the composed image to come from the fake image. The second row schematically shows the composed sensor data, in this case a CutMix image from a real and fake sample. For example, image 531 may have been obtained by taking the part from fake image 502 indicated by mask 511 and taking the part from real image 501 indicated by mask 511.

For example, if the images 501 and 502 are images taken from the environment of a vehicle, e.g., street scenes, then the composed image 531 may partly show a realistic street scene and partly a less-realistic looking generated street scene. The same holds for products, e.g., goods, which may or may not have production defects. A composed sensor data may show the product but part of it corresponds to measured sensor data, e.g., an image of the product as it rolls of a production line, with the other part synthesized.

For example, in an embodiment a new training sample is composed $\tilde{x}$ for the discriminator by mixing measured sensor data x and synthesized sensor data $G(z) \in R^{W \times H \times C}$ with the mask M:

$\tilde{x} = mix(x, G(z), M),$ $$mix(x, G(z), M) = M \odot x + (1-M) \odot G(z), \quad (6)$$

where $M \in \{0,1\}^{W \times H}$ is the binary mask indicating if the pixel (i,j) comes from the real ($M_{i,j}=1$) or fake ($M_{i,j}=0$) image, 1 is a binary mask filled with ones, and $\odot$ is an element-wise multiplication.

Figure 5B:
FIG. 5b schematically shows examples of an embodiment of data in an embodiment of a training method, in accordance with the present invention.

FIG. 5b shows an example of composed sensor data, in this case, the left half of the image is a real image, e.g., measured sensor data, while the part on the right is a synthesized image, e.g., synthesized sensor data. The same could be done with two real images. For example, the image of FIG. 5b may be a fidelity destroyed image for image 401.

Embodiments may be used in GAN models for data synthesis and data augmentation. Its use is particularly advantages when collecting additional data is expensive or legally not possible. In the context of autonomous driving this includes extreme situations, like dangerously maneuvering cars or near-hit situations involving pedestrians.

For example, the methods, e.g., training methods, may be computer implemented methods. For example, accessing training data, and/or receiving input data may be done using a communication interface, e.g., an electronic interface, a network interface, a memory interface, etc. For example, storing or retrieving parameters may be done from an electronic storage, e.g., a memory, a hard drive, etc., e.g., parameters of the networks. For example, applying a neural network to data of the training data, and/or adjusting the stored parameters to train the network may be done using an electronic computing device, e.g., a computer.

The neural networks, either during training and/or during applying may have multiple layers, which may include, e.g., convolutional layers and the like. For example, the neural network may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform the method, e.g., method 300. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

Below a particular detailed embodiment is discussed, which is built upon the state-of-the-art BigGAN model, and extend its discriminator. For details on BigGAN see, Andrew Brock, Jeff Donahue, and Karen Simonyan, "Large scale GAN training for high fidelity natural image synthesis" In *International Conference on Learning Representations (ICLR)*, 2019; included herein by reference and referred to as 'BigGAN'.

Different than described in BigGAN are, e.g., the addition of transforms F and/or T. To train the system, one could take
1. Take a batch of real x and a noise z, and compute x'=G(z), D(x), D(x'), D(F(x)), D(T(x)), and D(F(x'))
2. Optimize D for a number of iterations using the BigGAN loss-term but with the addition of one or more new loss terms as defined herein.
3. Optimize G for a number of iterations using the BigGAN loss-term but with the addition of one or more new loss terms as defined herein.
4. Go to step 1, until training is finished, e.g., until convergence, until a fixed number of iterations, etc.

Experiments were performed in a conditional and in an unconditional embodiment. Note that the original BigGAN is a class-conditional model. For the unconditional model, the class-conditional BatchNorm may be replaced with selfmodulation, wherein the BatchNorm parameters are conditioned only on the latent vector z, and do not use the class projection of in the discriminator.

During the training, for each iteration, a mini-batch of CutMix images (x~; c; M) may be created, e.g., with a probability $r_{mix}$. This probability may be increased linearly from 0 to 0.5 between the first n epochs in order to give the generator time to learn how to synthesize more real looking samples and not to give the discriminator too much power from the start. CutMix images are created from the existing real/real and/or real/fake images in the mini-batch using binary masks M. For sampling M, one may first sample the combination ratio c between the real and generated images from the uniform distribution (0, 1) and then uniformly sample the bounding box coordinates for the cropping regions of x and G(z) to preserve the c ratio.

The original training parameters of BigGAN may be adopted. In particular, one may use a uniformly distributed noise vector z in $[-1, 1]^{140}$ as input to the generator, and the Adam optimizer with learning rates of 1e-4 and 5e-4 for G and DU. It was found beneficial in experiments to operate with considerably smaller mini-batch sizes than BigGAN, e.g., batch sizes between 20 and 50.

Figure 6:
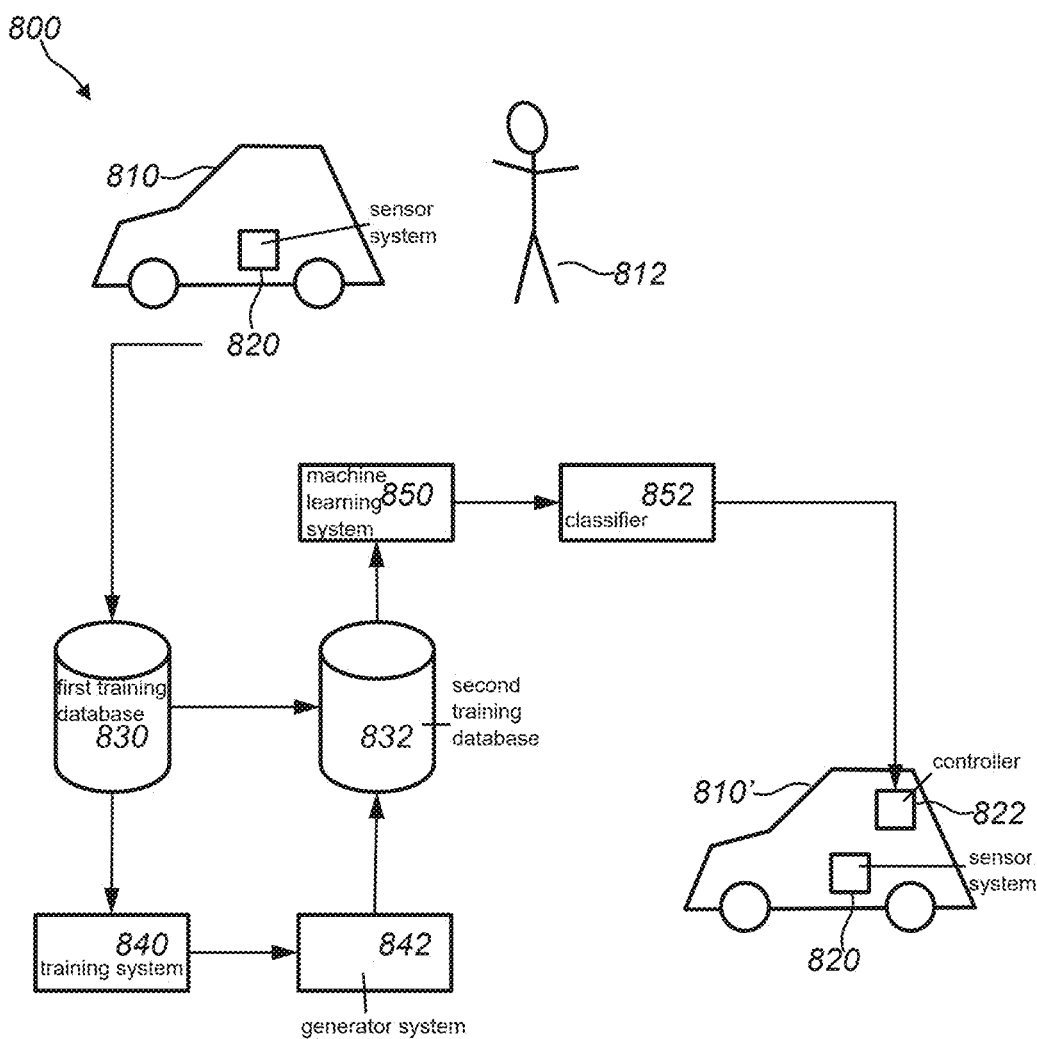
FIG. 6 schematically shows an example of an embodiment of a training system, in accordance with the present invention.

FIG. 6 schematically shows an example of an embodiment of a training system 840.

FIG. 6 shows an autonomous apparatus, in this case an autonomous car 810', situated in an environment 800, e.g., a traffic situation. In environment 800 there may be various objects, both static and dynamic, that affect how the apparatus 810 may be controlled. A similar apparatus, in this case car 810, may be used to obtain measured sensor data. For example, shown in FIG. 6 is a pedestrian 812 crossing the environment behind car 810. Apparatus 810 may be autonomous but does not need to be. Apparatus 810 and 810' may be the same except for an update in controller 822.

Car 810 may comprise a sensor system 820, e.g., comprising one or more image sensors, radar, LIDAR and so on, to sense the environment of the car, e.g., environment 800. For example, sensor system 820 may be configured to produce measured sensor data comprising information on environment 800. Car 810 may comprise one or more actuators to move the car through environment 800, e.g., wheels and motor.

Sensor data obtained from sensor system 820 may be stored in a first training database 830. A training system 840, e.g., configured for an embodiment of a training method for training a generator neural network may be configured to train a generator to generate synthesized sensor data which appears to be drawn from first training database 830. Training system may be configured to obtain an initial training set form first database 830 and train a generator network from the initial training set. For example, a training system 840 may produce a generator network for use in a generator system 842. Generator system 842 may be used to generate additional sensor data, e.g., synthesized sensor data. The synthesized sensor data may be stored in a second training database 832. The second training database 832 may also comprise the original measured sensor data, e.g., taken from first database 830.

The synthesized training data may be generated with or without the use of class-labels. For example, the measured training data in first database 830 may be labeled, e.g., by apparatus 810, by sensor 820, by a further device (not shown), or by a human. The class labels may be used to generate synthesized sensor data of a particular kind, e.g., with a nearby pedestrian. An unconditional generator neural network may be configured to receive as input a measured sensor data or a noise vector, or both. Also a conditional generator neural network may be configured to receive as input a measured sensor data or a noise vector, or both. Both types may be trained for pure generation or for domain transfer or for a combination, e.g., generation in the context of a measured sensor data.

A machine learning system 850 may be configured to train a machine learnable model on the training data in second database 832. For example, the machine learnable model may be a classifier. The machine learnable model may comprise a neural network, but this is not necessary; For example, it may comprise an SVM, random forests, and so on. Machine learning system 850 may be configured with a learning algorithms consistent with the type of machine learnable model, e.g., SVM training or random forest training. Machine learning system 850 may use the synthesized sensor data for training, for testing, or for both. Machine learning system 850 produces a trained classifier 852. For example, classifier 852 may be configured to classify an object in the environment of the apparatus from the measured sensor data.

The classifier 852 may be included in a controller for an autonomous apparatus 810', e.g., like car 810. For example, a controller 822 may comprise classifier 852. Controller 822 may be configured to generate a control signal to control the autonomous apparatus 810'. Controller 822 may be configured to generate a control signal at least from the object classified by the classifier. For example, if classifier 852 classifies that an environment 800 comprises a pedestrian like 812, then it is not safe to revert the car. The control signal may be configured to control the actuators, e.g., turning and steering of the wheels and/or motor.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
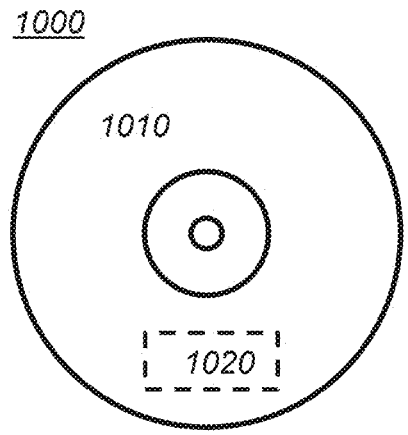
FIG. 7a schematically shows a computer readable medium having a writable part comprising a computer program according to an embodiment, in accordance with the present invention.

FIG. 7a shows a computer readable medium 1000 having a writable part 1010 comprising a computer program 1020, the computer program 1020 comprising instructions for causing a processor system to perform a training method according to an embodiment. The computer program 1020 may be embodied on the computer readable medium 1000 as physical marks or by magnetization of the computer readable medium 1000. However, any other suitable embodiment is possible as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said training method.

Figure 7B:
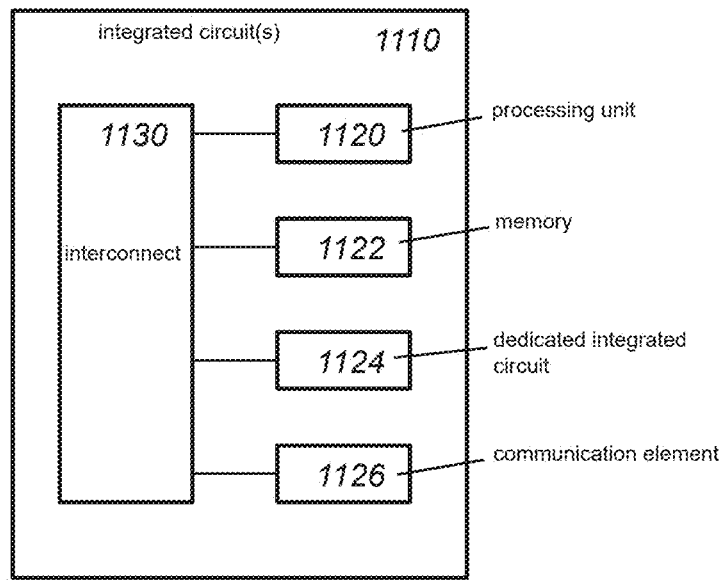
FIG. 7b schematically shows a representation of a processor system according to an embodiment, in accordance with the present invention.

FIG. 7b shows in a schematic representation of a processor system 1140 according to an embodiment of a training system, or generator system. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., a training device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1140 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1140 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

Use of the verb 'comprise' and its conjugations does not exclude the presence of elements or steps other than those stated. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter of the present invention may be implemented by hardware comprising several distinct elements, and by a suitably programmed computer. In a device enumerating several parts, several of these parts may be embodied by one and the same item of hardware. The mere fact that certain measures are described separately does not indicate that a combination of these measures cannot be used to advantage.

What is claimed is:

1. A training method for training a generator neural network configured to generate synthesized sensor data, the method comprising the following steps:
   accessing a training set of measured sensor data obtained from a sensor; and
   training the generator neural network together with a discriminator neural network, the training including:
      generating synthesized sensor data using the generator neural network,
      optimizing the discriminator network to distinguish between the measured sensor data and the synthesized sensor data,
      optimizing the generator neural network to generate the synthesized sensor data, the synthesized sensor data being indistinguishable from the measured sensor data by the discriminator network;
   wherein:
      (i) a fidelity destroying transformation is defined to transform measured sensor data to obtain fidelity-destroyed transformed measured sensor data, and the training further includes optimizing the discriminator network to distinguish between the measured sensor data and the fidelity-destroyed transformed measured sensor data, and/or
      (ii) a fidelity preserving transformation is defined to transform the measured sensor data to obtain fidelity-preserved transformed measured sensor data, and the training further includes optimizing the discriminator network not to distinguish between the measured sensor data and the fidelity-preserving transformed measured sensor data, wherein the optimizing of the discriminator network involves the discriminator network being configured to generate a discriminator value indicating at least if a discriminator input is a synthesized sensor data or a measured sensor data, wherein the training further includes:
         applying the fidelity preserving transformation to a synthesized sensor data to obtain a fidelity-preserved transformed synthesized sensor data, the discriminator network being optimized to minimize a magnitude of a difference between the discriminator value indicating if the discriminator input is the synthesized sensor data and a discriminator value obtained for the fidelity-preserved transformed synthesized sensor data.

2. The training method as recited in claim 1, wherein the measured sensor data includes a measured image obtained from an image sensor, and wherein the synthesized sensor data includes a synthesized image.

3. The training method as recited in claim 1, wherein the optimizing of the discriminator network involves the discriminator network being configured to generate a discriminator value indicating at least if a discriminator input is a synthesized sensor data or a measured sensor data, wherein:
   (i) the discriminator network is optimized to maximize a magnitude of a difference between a discriminator value obtained for a measured sensor data and a discriminator value obtained for a corresponding fidelity-destroyed transformed measured sensor data, and/or
   (ii) the discriminator network is optimized to minimize a magnitude of a difference between a discriminator value obtained for a measured sensor data and a discriminator value obtained for a corresponding fidelity-preserved transformed measured sensor data.

4. The training method as recited in claim 1, wherein:
   the fidelity-destroying transformation includes one or more of: a blurring operating, perturbation of pixels, a horizontal mirror operation, a spline operation, a color-change, a partial overwriting, and/or
   the fidelity-preserving transformation includes one or more of: an affine transformation, a rotation, a translation, a vertical mirror operation.

5. The training method as recited in claim 1, wherein the optimizing of the discriminator network involves the discriminator network being optimized to maximize $(\alpha \|D(T(x))-D(x)\|+1)/(\beta \|D(F(x))-D(x)\|+\varepsilon)$, wherein:
   $\alpha$, $\beta$ and $\varepsilon$ represent parameters,
   D represents the discriminator network,
   T represents the fidelity-destroying transformation,
   F represents the fidelity-preserving transformation, and
   x represents a measured sensor data.

6. The training method as recited in claim 1, wherein the optimizing of the discriminator network involves the discriminator network being optimized to maximize $1/(\|D(F(G(z)))-D(G(z))\|+\varepsilon)$, wherein:
   $\varepsilon$ represents a parameter,
   D represents the discriminator network,
   G represents the generator neural network,
   F represents the fidelity-preserving transformation, and
   z represents an input of the generator neural network.

7. The training method as recited in claim 1, wherein the generator neural network is configured to receive a measured sensor data as input and to generate a synthesized sensor data as output, wherein:
   an equivariant transformation is defined configured to transform the measured sensor data or the synthesized sensor data to equivariant transformed measured sensor data or to equivariant transformed synthesized sensor data respectively, the training including optimizing the generator neural network to minimize a difference between:
      the equivariant transformation applied to an output of the generator neural network applied to the measured sensor data, and
      the generator neural network applied to an output of the equivariant transformation applied to the measured sensor data.

8. A method to generate further training data for a machine learnable model, the method comprising the following steps:
   obtaining an initial training set for the machine learnable model, the initial training set including measured sensor data obtained from a sensor;
   training a generator neural network from the initial training set by:
      generating synthesized sensor data using the generator neural network,
      optimizing a discriminator network to distinguish between the measured sensor data and the synthesized sensor data,
      optimizing the generator neural network to generate the synthesized sensor data, the synthesized sensor data being indistinguishable from the measured sensor data by the discriminator network;
   wherein:
      (i) a fidelity destroying transformation is defined to transform measured sensor data to obtain fidelity-destroyed transformed measured sensor data, and the training further includes optimizing the discriminator network to distinguish between the measured sensor data and the fidelity-destroyed transformed measured sensor data, and/or (ii) a fidelity preserving transformation is defined to transform the measured sensor data to obtain fidelity-preserved transformed measured sensor data, and the training further includes optimizing the discriminator network not to distinguish between the measured sensor data and the fidelity-preserving transformed measured sensor data;

applying the trained generator neural network to generate the further training data, wherein the optimizing of the discriminator network involves the discriminator network being configured to generate a discriminator value indicating at least if a discriminator input is a synthesized sensor data or a measured sensor data, wherein the training further includes:

applying the fidelity preserving transformation to a synthesized sensor data to obtain a fidelity-preserved transformed synthesized sensor data, the discriminator network being optimized to minimize a magnitude of a difference between the discriminator value indicating if the discriminator input is the synthesized sensor data and a discriminator value obtained for the fidelity-preserved transformed synthesized sensor data.

9. A method to train a machine learnable model, the method comprises the following steps:

obtaining an initial training set for the machine learnable model;

generating further training data for the machine learnable model by:

training a generator neural network from the initial training set by:

generating synthesized sensor data using the generator neural network, optimizing a discriminator network to distinguish between the measured sensor data and the synthesized sensor data, optimizing the generator neural network to generate the synthesized sensor data, the synthesized sensor data being indistinguishable from the measured sensor data by the discriminator network;

wherein:

(i) a fidelity destroying transformation is defined to transform measured sensor data to obtain fidelity-destroyed transformed measured sensor data, and the training further includes optimizing the discriminator network to distinguish between the measured sensor data and the fidelity-destroyed transformed measured sensor data, and/or (ii) a fidelity preserving transformation is defined to transform the measured sensor data to obtain fidelity-preserved transformed measured sensor data, and the training further includes optimizing the discriminator network not to distinguish between the measured sensor data and the fidelity-preserving transformed measured sensor data;

applying the trained generator neural network to generate the further training data; and training and/or testing the machine learnable model at least on the further training data, wherein the optimizing of the discriminator network involves the discriminator network being configured to generate a discriminator value indicating at least if a discriminator input is a synthesized sensor data or a measured sensor data, wherein the training further includes:

applying the fidelity preserving transformation to a synthesized sensor data to obtain a fidelity-preserved transformed synthesized sensor data, the discriminator network being optimized to minimize a magnitude of a difference between the discriminator value indicating if the discriminator input is the synthesized sensor data and a discriminator value obtained for the fidelity-preserved transformed synthesized sensor data.

10. A training system for training a generator neural network configured to generate synthesized sensor data, the system comprising:

a communication interface configured to access a training set of measured sensor data obtained from a sensor; and a processor system configured to train the generator neural network together with a discriminator neural network, wherein the processor is configured to perform a training that includes:

generating synthesized sensor data using the generator neural network, optimizing the discriminator network to distinguish between the measured sensor data and the synthesized sensor data, and optimizing the generator neural network to generate the synthesized sensor data, the synthesized sensor data being indistinguishable from the measured sensor data by the discriminator network;

wherein:

a fidelity destroying transformation is defined to transform the measured sensor data to obtain fidelity-destroyed transformed measured sensor data, the training further including optimizing the discriminator network to distinguish between the measured sensor data and the fidelity-destroyed transformed measured sensor data, and/or a fidelity preserving transformation is defined to transform measured sensor data to obtain fidelity-preserved transformed measured sensor data, the training further including optimizing the discriminator network not to distinguish between the measured sensor data and the fidelity-preserving transformed measured sensor data, wherein the optimizing of the discriminator network involves the discriminator network being configured to generate a discriminator value indicating at least if a discriminator input is a synthesized sensor data or a measured sensor data, wherein the training further includes:

applying the fidelity preserving transformation to a synthesized sensor data to obtain a fidelity-preserved transformed synthesized sensor data, the discriminator network being optimized to minimize a magnitude of a difference between the discriminator value indicating if the discriminator input is the synthesized sensor data and a discriminator value obtained for the fidelity-preserved transformed synthesized sensor data.

11. A generator system for a generator neural network arranged to generate synthesized sensor data, the system comprising:

a processor system arranged to apply a trained generator neural network, wherein the generator neural network has been trained with a training system for training the generator neural network to generate synthesized sensor data, the training system including:
a first communication interface configured to access a training set of measured sensor data obtained from a sensor; and
a first processor system configured to train the generator neural network together with a discriminator neural network, wherein the training system configured to perform a training that includes:
generating synthesized sensor data using the generator neural network,
optimizing the discriminator network to distinguish between the measured sensor data and the synthesized sensor data, and
optimizing the generator neural network to generate the synthesized sensor data, the synthesized sensor data being indistinguishable from the measured sensor data by the discriminator network;
wherein:
a fidelity destroying transformation is defined to transform the measured sensor data to obtain fidelity-destroyed transformed measured sensor data, the training further including optimizing the discriminator network to distinguish between the measured sensor data and the fidelity-destroyed transformed measured sensor data, and/or
a fidelity preserving transformation is defined to transform measured sensor data to obtain fidelity-preserved transformed measured sensor data, the training further including optimizing the discriminator network not to distinguish between the measured sensor data and the fidelity-preserving transformed measured sensor data; and
a communication interface for transmitting or storing the synthesized sensor data, wherein the optimizing of the discriminator network involves the discriminator network being configured to generate a discriminator value indicating at least if a discriminator input is a synthesized sensor data or a measured sensor data, wherein the training further includes:
applying the fidelity preserving transformation to a synthesized sensor data to obtain a fidelity-preserved transformed synthesized sensor data, the discriminator network being optimized to minimize a magnitude of a difference between the discriminator value indicating if the discriminator input is the synthesized sensor data and a discriminator value obtained for the fidelity-preserved transformed synthesized sensor data.

12. An autonomous apparatus, comprising:
a sensor configured to sense an environment of the apparatus and to generate measured sensor data;
a classifier including a machine learnable model, the classifier being trained to classify an object in the environment of the apparatus from the measured sensor data;
a controller configured to generate a control signal to control the autonomous apparatus, the controller being configured to generate the control signal at least from the object classified by the classifier;
an actuator configured to move under the control of the control signal;
wherein the machine learnable model is trained by:
obtaining an initial training set for the machine learnable model;
generating further training data for the machine learnable model by:
training a generator neural network from the initial training set by:
generating synthesized sensor data using the generator neural network,
optimizing a discriminator network to distinguish between the measured sensor data and the synthesized sensor data,
optimizing the generator neural network to generate the synthesized sensor data, the synthesized sensor data being indistinguishable from the measured sensor data by the discriminator network;
wherein:
(i) a fidelity destroying transformation is defined to transform measured sensor data to obtain fidelity-destroyed transformed measured sensor data, and the training further includes optimizing the discriminator network to distinguish between the measured sensor data and the fidelity-destroyed transformed measured sensor data, and/or
(ii) a fidelity preserving transformation is defined to transform the measured sensor data to obtain fidelity-preserved transformed measured sensor data, and the training further includes optimizing the discriminator network not to distinguish between the measured sensor data and the fidelity-preserving transformed measured sensor data;
applying the trained generator neural network to generate the further training data; and
training and/or testing the machine learnable model at least on the further training data, wherein the optimizing of the discriminator network involves the discriminator network being configured to generate a discriminator value indicating at least if a discriminator input is a synthesized sensor data or a measured sensor data, wherein the training further includes:
applying the fidelity preserving transformation to a synthesized sensor data to obtain a fidelity-preserved transformed synthesized sensor data, the discriminator network being optimized to minimize a magnitude of a difference between the discriminator value indicating if the discriminator input is the synthesized sensor data and a discriminator value obtained for the fidelity-preserved transformed synthesized sensor data.

13. The autonomous apparatus as recited in claim 12, wherein the autonomous apparatus is an autonomous vehicle.

14. A non-transitory computer readable medium on which is stored data representing instructions for training a generator neural network configured to generate synthesized sensor data, the instructions, when executed by a processor system, causing the processor system to perform the following steps:
accessing a training set of measured sensor data obtained from a sensor; and
training the generator neural network together with a discriminator neural network, the training including:
generating synthesized sensor data using the generator neural network, optimizing the discriminator network to distinguish between the measured sensor data and the synthesized sensor data, optimizing the generator neural network to generate the synthesized sensor data, the synthesized sensor data being indistinguishable from the measured sensor data by the discriminator network;

wherein:
(i) a fidelity destroying transformation is defined to transform measured sensor data to obtain fidelity-destroyed transformed measured sensor data, and the training further includes optimizing the discriminator network to distinguish between the measured sensor data and the fidelity-destroyed transformed measured sensor data, and/or (ii) a fidelity preserving transformation is defined to transform the measured sensor data to obtain fidelity-preserved transformed measured sensor data, and the training further includes optimizing the discriminator network not to distinguish between the measured sensor data and the fidelity-preserving transformed measured sensor data, wherein the optimizing of the discriminator network involves the discriminator network being configured to generate a discriminator value indicating at least if a discriminator input is a synthesized sensor data or a measured sensor data, wherein the training further includes:

applying the fidelity preserving transformation to a synthesized sensor data to obtain a fidelity-preserved transformed synthesized sensor data, the discriminator network being optimized to minimize a magnitude of a difference between the discriminator value indicating if the discriminator input is the synthesized sensor data and a discriminator value obtained for the fidelity-preserved transformed synthesized sensor data.

* * * * *